May 20, 1941.   M. GARBELL   2,242,908
ADDING AND RECORDING MACHINE
Filed March 24, 1934   22 Sheets-Sheet 1

Inventor:
Max Garbell
By [signature] Atty.

May 20, 1941. M. GARBELL 2,242,908
ADDING AND RECORDING MACHINE
Filed March 24, 1934 22 Sheets-Sheet 2

Inventor:
Max Garbell

May 20, 1941. M. GARBELL 2,242,908
ADDING AND RECORDING MACHINE
Filed March 24, 1934 22 Sheets-Sheet 4

Inventor
Max Garbell
By Leo J. Dutkain Atty.

May 20, 1941.    M. GARBELL    2,242,908
ADDING AND RECORDING MACHINE
Filed March 24, 1934    22 Sheets-Sheet 7

May 20, 1941.　　　M. GARBELL　　　2,242,908
ADDING AND RECORDING MACHINE
Filed March 24, 1934　　　22 Sheets-Sheet 15

Inventor:
Max Garbell

May 20, 1941.    M. GARBELL    2,242,908
ADDING AND RECORDING MACHINE
Filed March 24, 1934    22 Sheets-Sheet 19
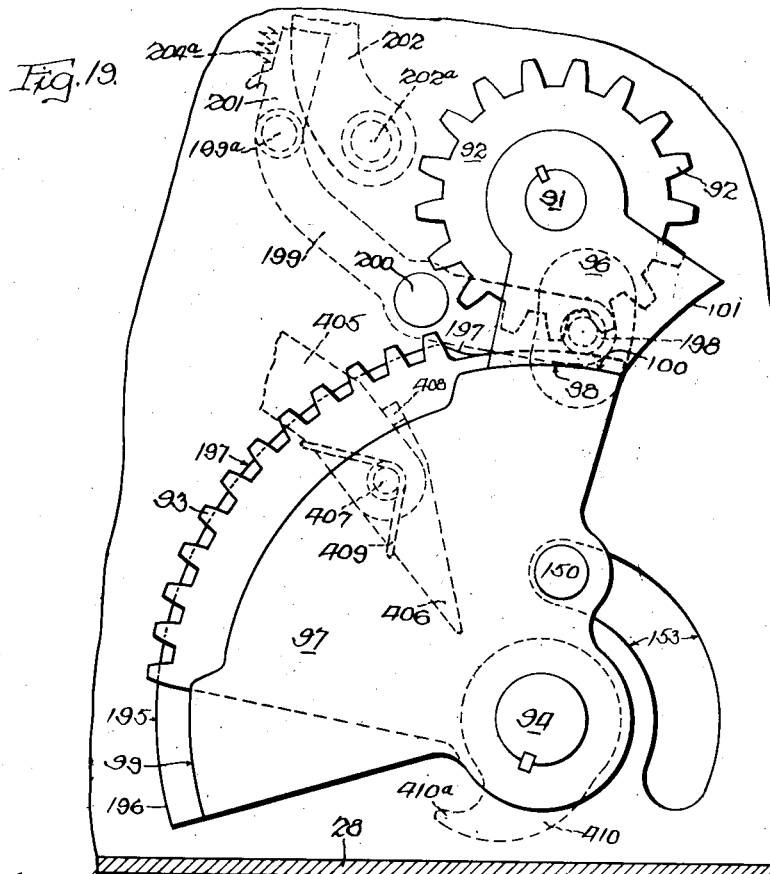
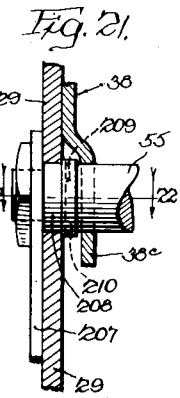
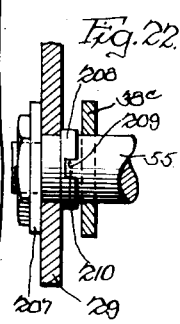
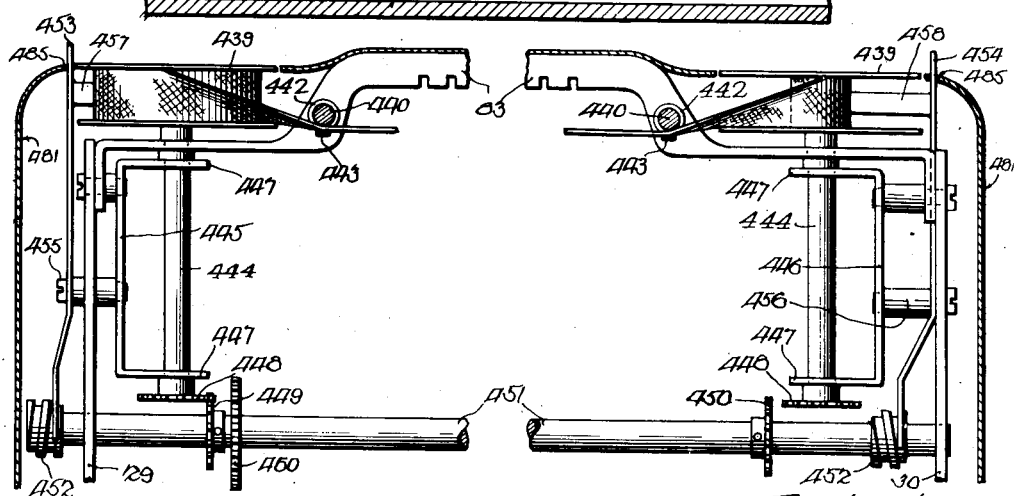

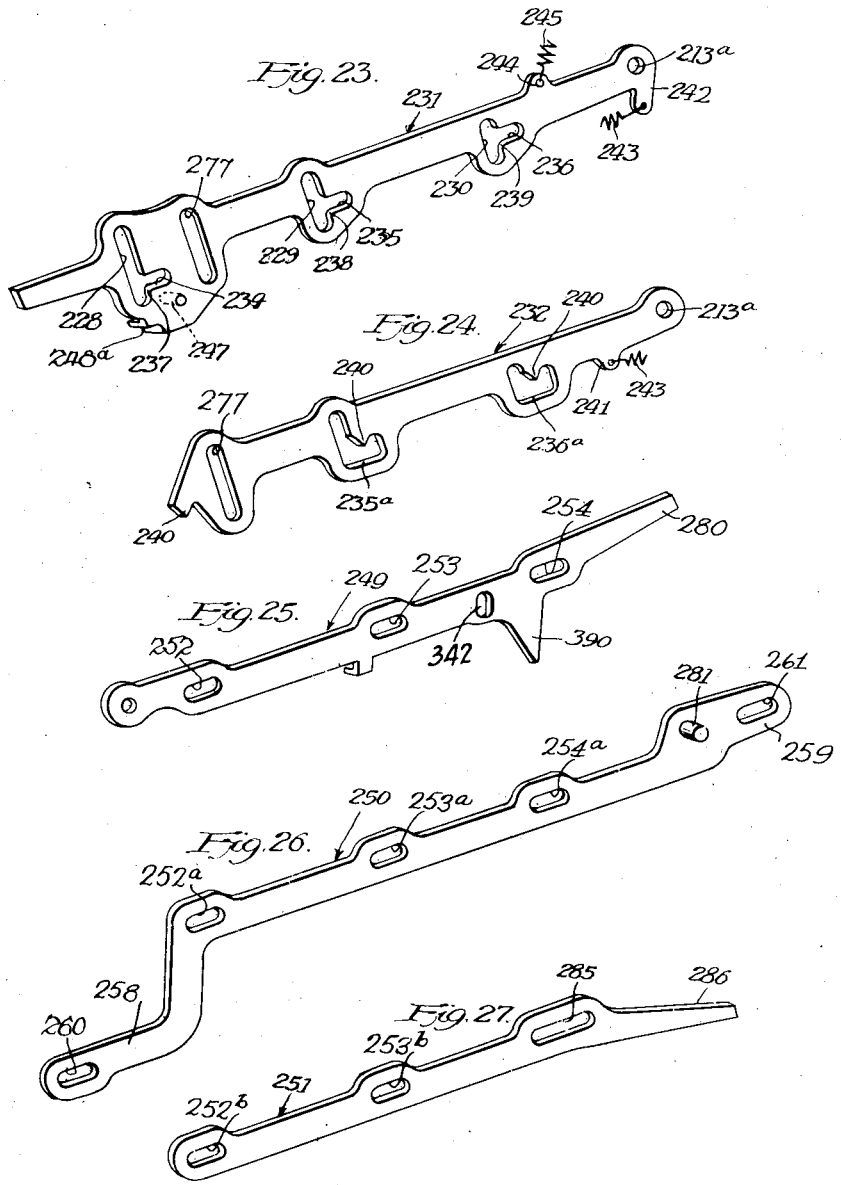

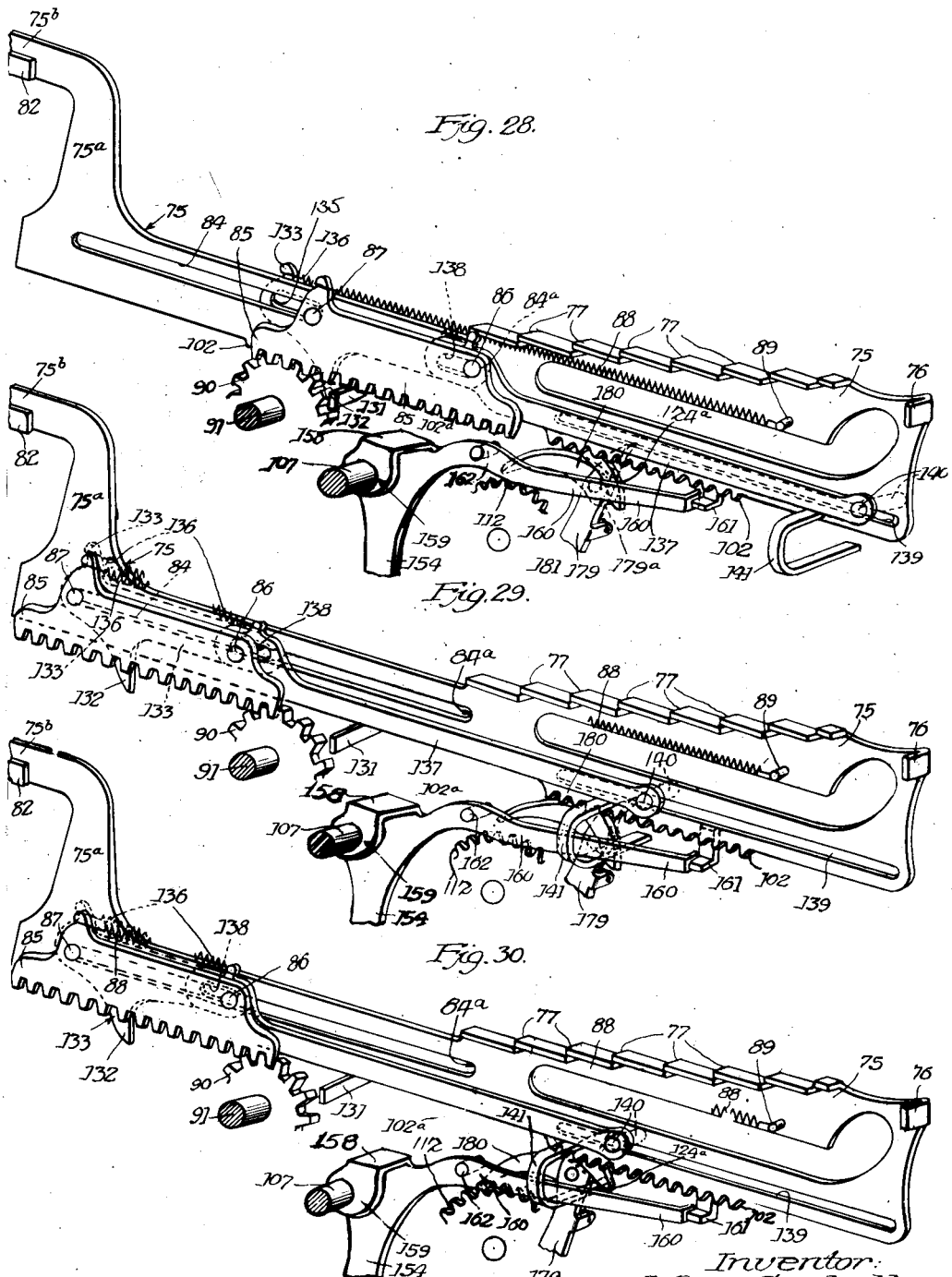

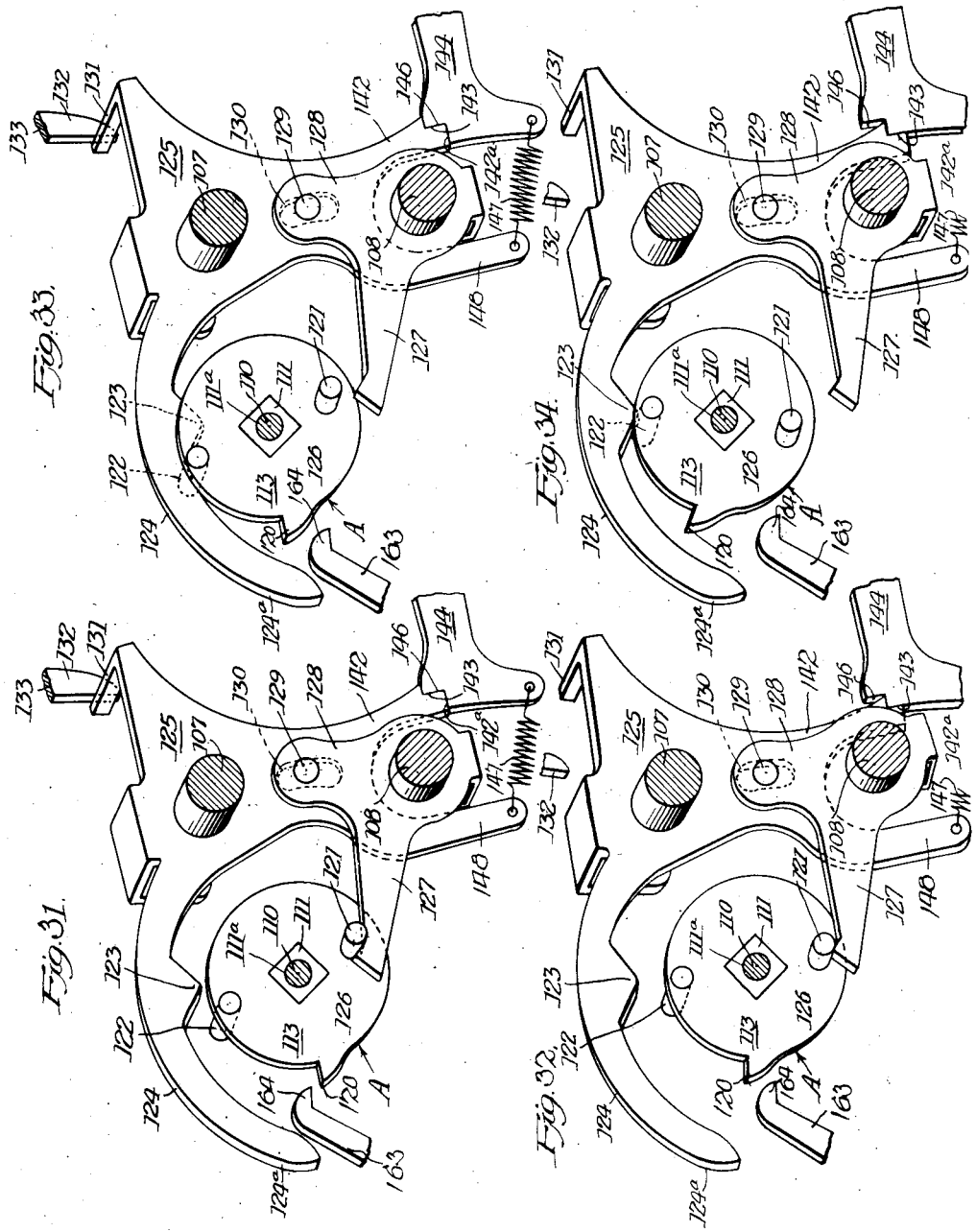

Patented May 20, 1941

2,242,908

UNITED STATES PATENT OFFICE 2,242,908

ADDING AND RECORDING MACHINE

Max Garbell, Chicago, Ill., assignor to Victor Adding Machine Company, Chicago, Ill., a corporation of Illinois Application March 24, 1934, Serial No. 717,156

3 Claims. (Cl. 235—60)

The invention relates to improvements in adding and recording machines and more particularly to those features which simplify the construction and operation and permits of compactness which make for a relatively small machine without sacrificing the advantages gained in its construction.

The chief objects of the invention are the provision of novel, sturdy and efficient mechanism, so designed and arranged, for compactness, simplicity of construction and ease of accessibility to the operating parts, so as to make possible a comparatively low, stream-lined appearance to the general shape of the machine wherein the novel arrangement and features of the working parts for obtaining these results are not weakened or hampered, and wherein also, a concealed paper roll is carried and supplied to a platen roll as the machine is operated.

Another object is the provision of a key-set machine wherein the keys coact directly with type carrying type bars for limiting their movements in one direction to position the selected type thereof in a printing line and wherein the type bars are yieldingly driven by the driving mechanism of the machine permitting of a full stroke thereof during the positioning or non-positioning of the type bars; and to provide means for automatically selecting the positioning of the unselected type bars in either the printing or non-printing position.

A further object is the provision of a novel type of platen normally held in a retracted position and adapted to be actuated for an impact against the type of the type bars positioned in the printing line under the control of the keys and to be retracted to its at-rest position prior to the restoring movement of the type bars.

A still further object is the provision of novel and efficient mechanism for accumulating totals which includes new and improved totalizers or accumulator units operable by direct engagement with the type bars, carrying mechanism, and mechanism coacting with the totalizers whereby the setting of the type bars may be controlled in accordance with the totals set up in the totalizers for positioning the type of the type bars in the printing line in accordance with that of said totalizers for making an impression thereof.

Another novel feature is the provision of a unitary keyboard having a series of banks of spring-influenced keys therein and being positioned bodily over a plurality of slidably mounted type carrying type bars with a bank of keys controlling the movements of each type bar, and a printing mechanism including a platen and an inking ribbon for making impressions of the key selected type of the type bars.

The provision of control keys and a signal type bar controlled thereby, digit keys for setting up an amount with means under the control of the control keys for controlling the engagement of totalizers with a plurality of type bars for receiving the amount set up, whereby the signal bar and the totalizers will be positioned in accordance with the selected control key and restored to normal position upon the completion of the operation of the driving mechanism of the machine; and to provide manual means for selectively effecting the repeat operation of the set-up or the repeat of either the digit key set-up or the control key set-up.

Among the numerous other novel features of the invention are the means for automatically causing a partial turning movement of the platen to feed a record strip with each operation of the machine and a remote control means for manually causing the turning movements of the platen for adjusting the strip independently of the feeding mechanism; also, the provision of means for controlling the movements of the type bars whereby the depression of a key controlling the same in its movements also controls the positioning of the means in the lower order thereof for automatically limiting the movements of the type bars coacting therewith to position the zeros thereof in the printing line.

Other and further objects will become apparent from the ensuing description and claims.

Referring to the drawings:

Figure 19 is an enlarged fragmentary detail side elevation taken on the line 19—19 of Fig. 2, illustrating the Geneva member and Geneva lock, and also the segment drive for the type bars.

Figure 20 is a detail cross-sectional view showing the ribbon driving and reversing mechanism, taken on the lines 20—20 of Figs. 2 and 5.

Figure 6:
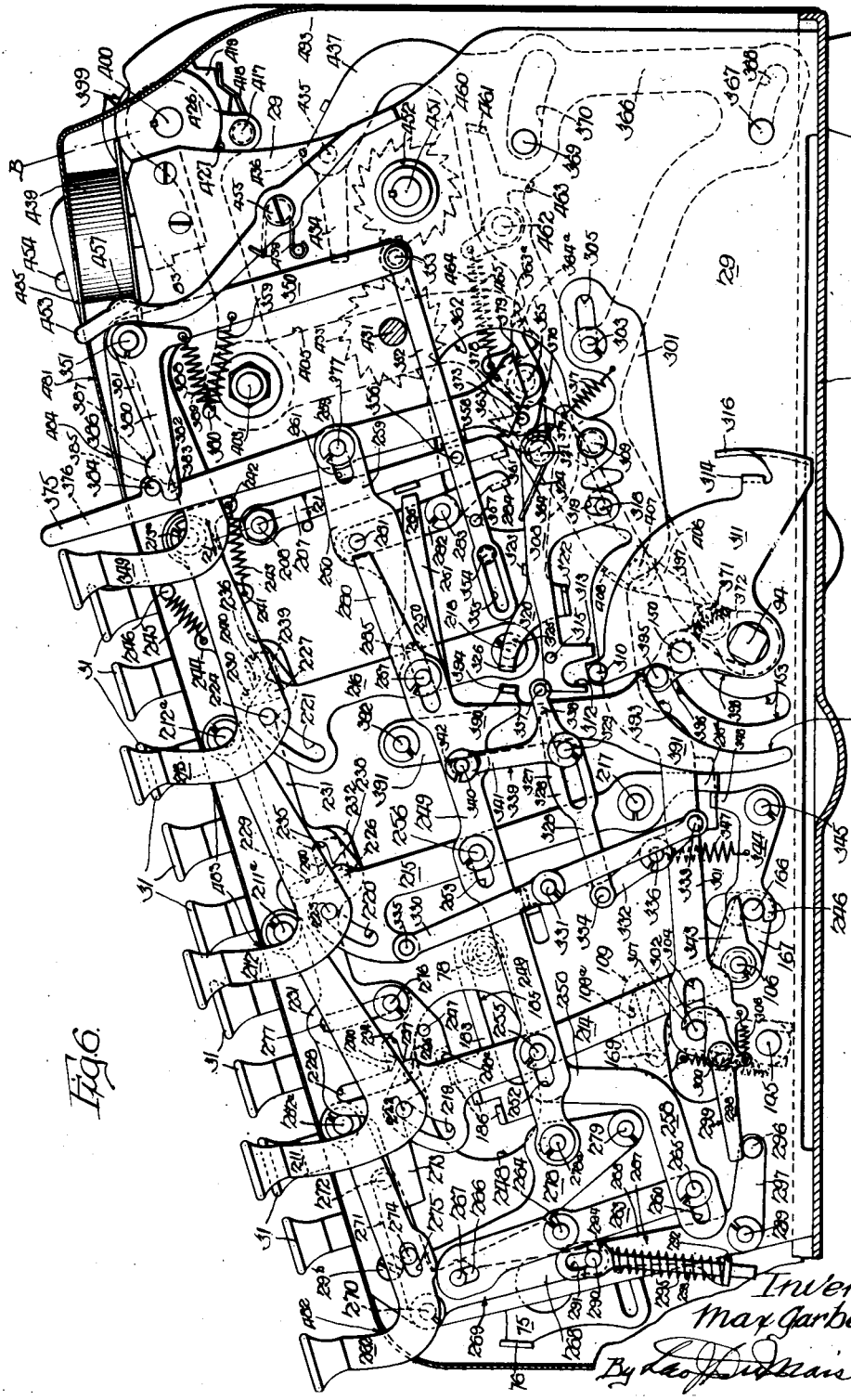
Figure 6 is a longitudinal sectional view taken on the lines 6—6 of Figs. 1 and 2 showing the casing or housing in section and illustrating the control keys and the parts operable thereby, in side elevation.

Figure 21 is an enlarged fragmentary detail sectional view taken on the line 21—21 of Fig. 6, illustrating the tongue-end groove connection of the arm 207 and stud shaft 208 with the slide lock shaft 55.

Figure 22 is a cross-sectional view taken on the line 22—22 of Fig. 21.

Figure 23 is a detail perspective view of the front member forming the control key lock.

Figure 24 is a detail perspective view of the rear member forming the control key lock.

Figure 25 is a detail perspective view of the outer shift member controlled by the control keys.

Figure 26 is a detail perspective view of the central shift member controlled by the control keys.

Figure 27 is a detail perspective view of the inner shift member controlled by the control keys.

Figure 28 is a partial detail perspective view of the type bar illustrating the slide and link carried thereon and with the type bar lock arm retaining the type bar locked.

Figure 29 is a detail perspective view similar to Fig. 28, illustrating the slide and link moved forwardly and with the link engaging the end 124a of the arcuate arm 124.

Figure 30 is a detail perspective view similar to Fig. 29, illustrating the arcuate arm 124 in raised position and released from the link.

Figure 31 is a detail perspective view of the rockable member 125 and illustrating the totalizer in lowered position and with the pin 122 of the total stop disc in engagement with the arm 127 coacting with the rockable member.

Figure 32 is a detail perspective view similar to Fig. 31 illustrating the total stop disc partially rotated with the pin 121 depressing the arm 127 to tilt the rockable member.

Figure 33 is a detail perspective view similar to Fig. 31 illustrating the totalizer in raised position and with the pin 122 of the total stop disc about to engage the cam of the rockable member; and Figure 34 is a detail perspective view similar to Fig. 33 illustrating the total stop disc partially rotated with the pin 122 thereof in engagement with the cam and tilting the rockable member.

The machine comprises a frame on which the working parts of the machine are mounted. A main actuator shaft is carried for rocking movements in the frame and is operatively connected to reciprocate a plurality of type bars, which are also carried in the frame. A self-contained key-board, which may be quickly attached to and detached from the frame, carries digit keys and various locking devices to control the movements of the type bars. The type bars are also provided with a lock which is under the control of the actuator shaft and under the control of a bank of control keys.

The totalizer units and certain other associated parts coacting therewith are carried on an individual frame, which is under the control of the actuator shaft and selectively controlled by the bank of control keys, to selectively cause the engagement or non-engagement of the totalizers with the type bars; the transfer mechanism therefor is carried on the frame and on the type bars.

A Geneva locking means is employed which permits of the conditioning of the machine at each limit stroke of the actuator shaft.

The ribbon mechanism and the paper feeding mechanism are under the control of the actuator shaft and are operable upon each operating stroke of the machine.

A dash-pot is operatively connected to the actuator shaft to regulate the movements of the operating mechanism at each limit movement thereof, and to provide a uniform movement throughout the operating stroke of the actuator shaft.

Figure 2:
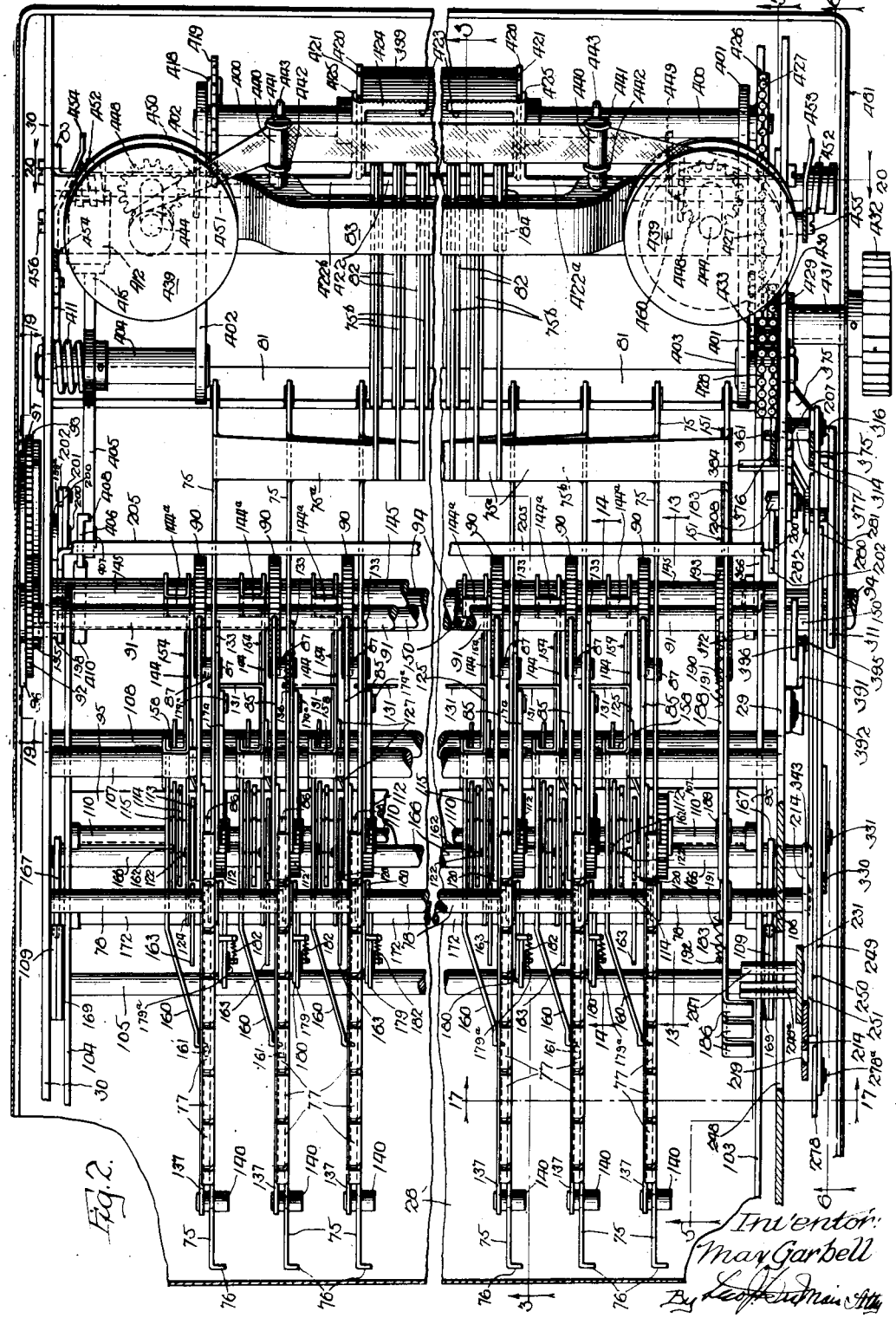
Figure 2 is a top plan sectional view taken substantially on the line 2—2 of Fig. 3.

The machine has a main drive or actuator shaft 94 journaled in a pair of spaced apart side plates 29 and 30 (Figs. 2, 3, 4 and 5), which are fixed to a bottom wall 28. The actuator shaft 94 is arranged for rocking movements in the side plates 29 and 30 and extends outwardly therethrough, and has a lever 486 fixed to the end adjacent the plate 29, which is provided with an operating handle 488. The actuator shaft 94 also has a driving segment 93 and a Geneva locking member 97 fixed thereto at its other end outwardly of the side plate 30 (Figs 2 and 19). The driving segment 93 coacts with a driving gear 92 fixed to a shaft 91 which is journaled in the side plates 29 and 30 above the actuator shaft 94 (Figs. 3, 4 and 5), while the Geneva member 97 coacts with a Geneva lock 96, which is also fixed to the shaft 91. This constitutes the driving mechanism for a plurality of type bars 75, operatively connected thereto by means of a plurality of gears 90 fixed to the shaft 91. The shaft 91 is rotated by engagement of the segment 93 with the gear 92 thereon, as the operating handle 488 is pulled forward to operate the machine (Fig. 19). The Geneva locking member 97 is adapted to engage the Geneva lock 96 at each limit movement of the actuator shaft 94 to retain the parts in locked position and to permit of a free partial movement of the actuator shaft upon its starting and return movements.

*Dash-pot*

A dash-pot 468 is also operatively connected to the actuator shaft 94 (Fig. 5), by means of an arm 473 pivotally connected to a lug 474 on a collar 475 fixed to the actuator shaft 94. The arm 473 is provided with a depending extension 476 that carries a follower 477 which is guided in a cam slot 478 provided in a member 479 secured to the bottom wall 28. The arm 473 extends rearwardly of the extension 476 and is operatively connected by means of a pivot pin 472 to a piston shaft 471, slidably positioned in the dash-pot 468, which is pivotally supported on a pivot 469 in a bracket 470 fixed to the bottom wall 28. The dash-pot operates in the usual way to aid in effecting a smoother operation of the machine.

*Type bars*

Figure 13:
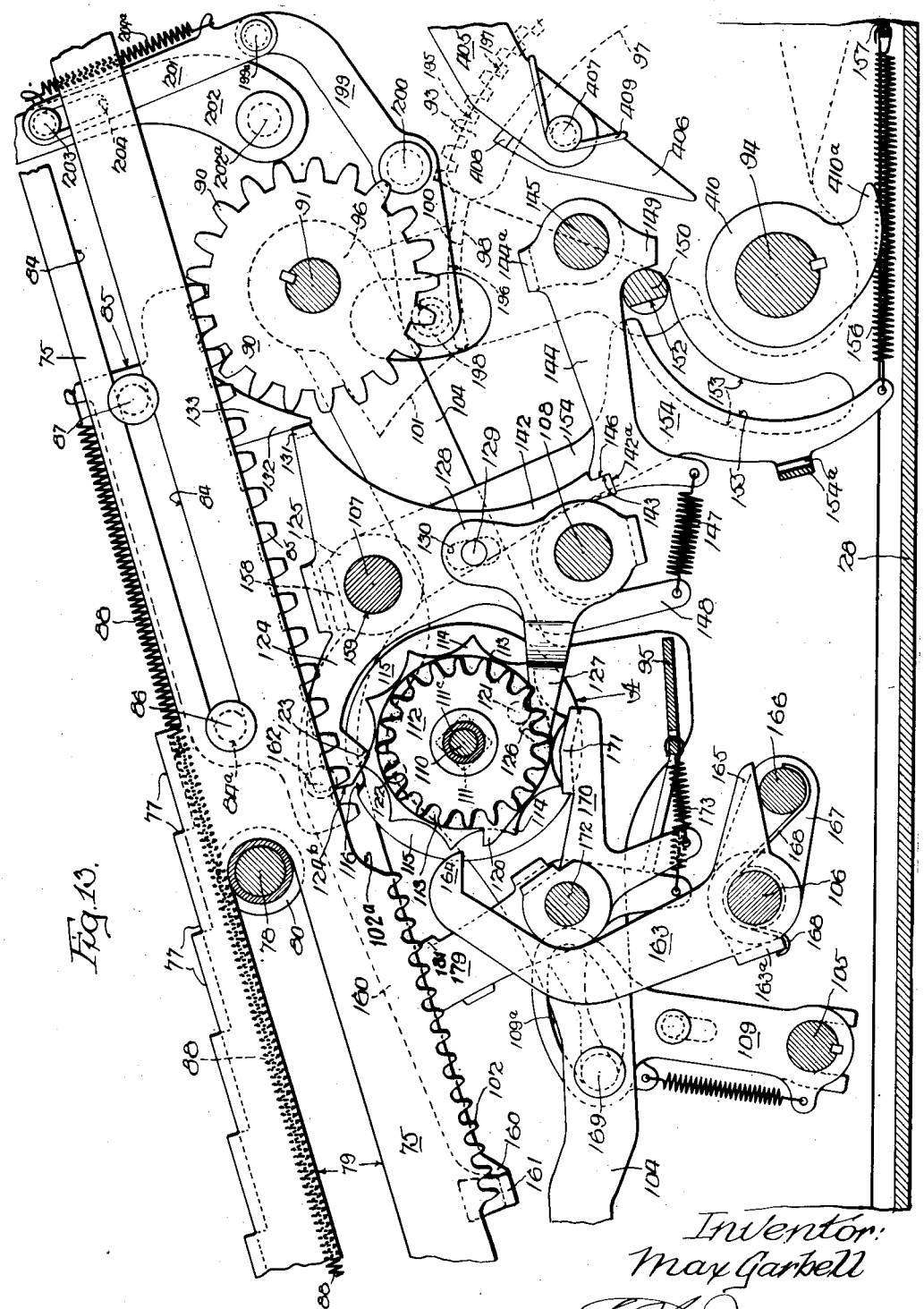
Figure 13 is an enlarged longitudinal detail sectional view taken on the line 13—13 of Fig. 2, showing the accumulators or totalizers and associated parts in their normal at-rest positions and with respect to the first type bar.
Figure 14:
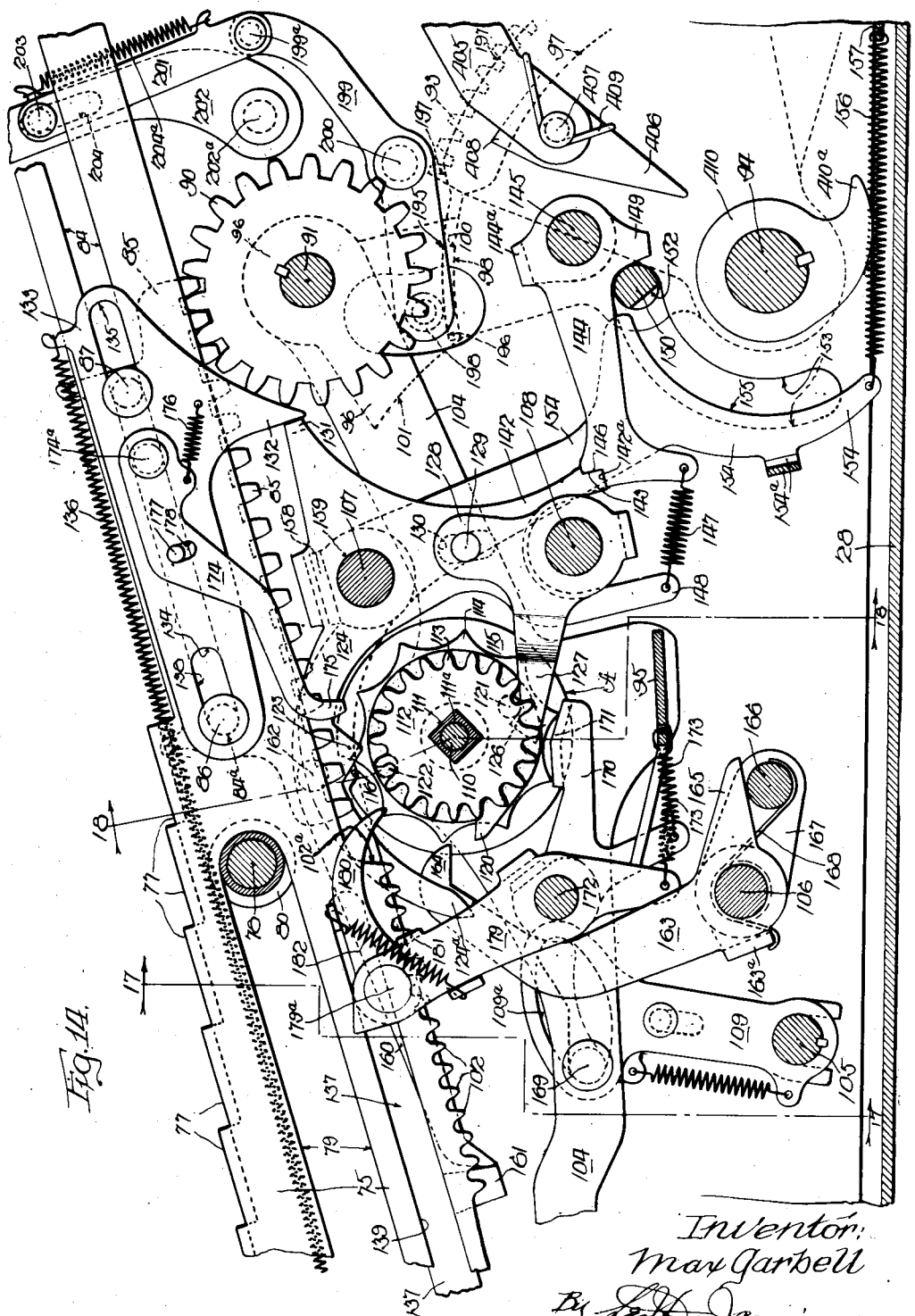
Figure 14 is an enlarged longitudinal detail sectional view taken on the line 14—14 of Fig. 2, showing the accumulators and associated parts in their normal at-rest positions with respect to the second type bar.

The type bars 75 (Figs. 2, 3 and 4), are arranged for reciprocating movements between the side plates 29 and 30 on a shaft 78 and are guided in combs 81 and 83, which are also fixed to the side plates 29 and 30. The type bars 75 are each provided with a relatively long slot opening 79 through which the shaft 78 extends, and which is secured to the side plates 29 and 30 (Fig. 2), and which carries a plurality of flanged rollers 80, adapted to guide the type bars in their sliding movements on the shaft 78. Rearwardly of the slot opening 79 (Figs. 2, 3 and 4), the type bars 75 are provided with relatively long and narrow slot openings 84, which are each adapted to receive a pair of studs 86 and 87 secured to each end of a rack 85 to guide the racks for independent sliding movements on the type bars. The racks 85 are connected to the type bar 75 on which they are mounted, by means of a relatively long tension spring 88 secured to the rack and to a pin 89 fixed in the type bar, the spring serving to retain the stud 86 of the rack 85 toward the end 85a of the slot opening 84 (Figs. 13 and 14).

The racks 85 are each in meshing engagement with a gear 90 carried on the shaft 91, that is rotated upon movement of the actuator shaft 94.

Each type bar 75 is provided with an angled formation 75a that terminates into a lateral extension 75b, which has a series of type ranging from "0" to "9," fixed to the under edge thereof and which is adapted to be selectively positioned into a printing line B, by the driving mechanism and under the control of a keyboard, which will be later described. The angled formations 75a of the type bars 75 (Fig. 2), are formed to bring the lateral extensions 75b in close proximity and parallel to each other, and are guided in the comb 83 at the rearward end of the machine. The type bars 75 are provided with a plurality of steps 77 (Figs. 3, 4 and 5), which are adapted to be engaged by one of a bank of keys carried in a keyboard that is bodily positioned above the type bars and removably secured to the side plates 29 and 30. The forward ends of the type bars are provided with an ear 76 that is adapted to be engaged by a pair of stops 58—65, which are under the control of a bank of digit keys in the keyboard, to determine the movement of the coacting type bar when moved by its driving mechanism. It will be understood that the rocking movement of the actuator shaft 94 carries the Geneva locking member 97 for a rocking movement therewith (Fig. 19), which causes a dwell 98 thereon to be carried in sliding relation with a surface 100 of the Geneva lock 96 which is fixed to the shaft 91, until the segmental gear 93 fixed to the actuator shaft 94, is brought into mesh with the driving gear 92 fixed to the shaft 91, at which time the dwell 98 will have passed the surface 100 of the Geneva lock 96, and the segmental gear 93 will rotate the gear 92 and the shaft 91 with the gears 90, to drive the racks 85. When the segmental gear 93 has moved out of mesh with the driving gear 92 (Fig. 15), the surface 101 of the Geneva lock 96 will be brought into engagement with a dwell 99 of the locking member 97, and retain the drive shaft 91 from turning movements while permitting the locking member 97 to be moved in advance thereof with the actuator shaft 94. The dwells 98 and 99 being at each peripheral end of the Geneva locking member 97, are brought into sliding relation with the surfaces 100 and 101 of the Geneva lock 96 at each limit movement of the actuator shaft 94. The rearward movement of the racks 85 will urge the type bars rearwardly by means of the springs 88, and should the type bars be withheld from movement (Figs. 4 and 15), the racks will be permitted to move in advance thereof against the tension of the springs 88.

Figure 15:
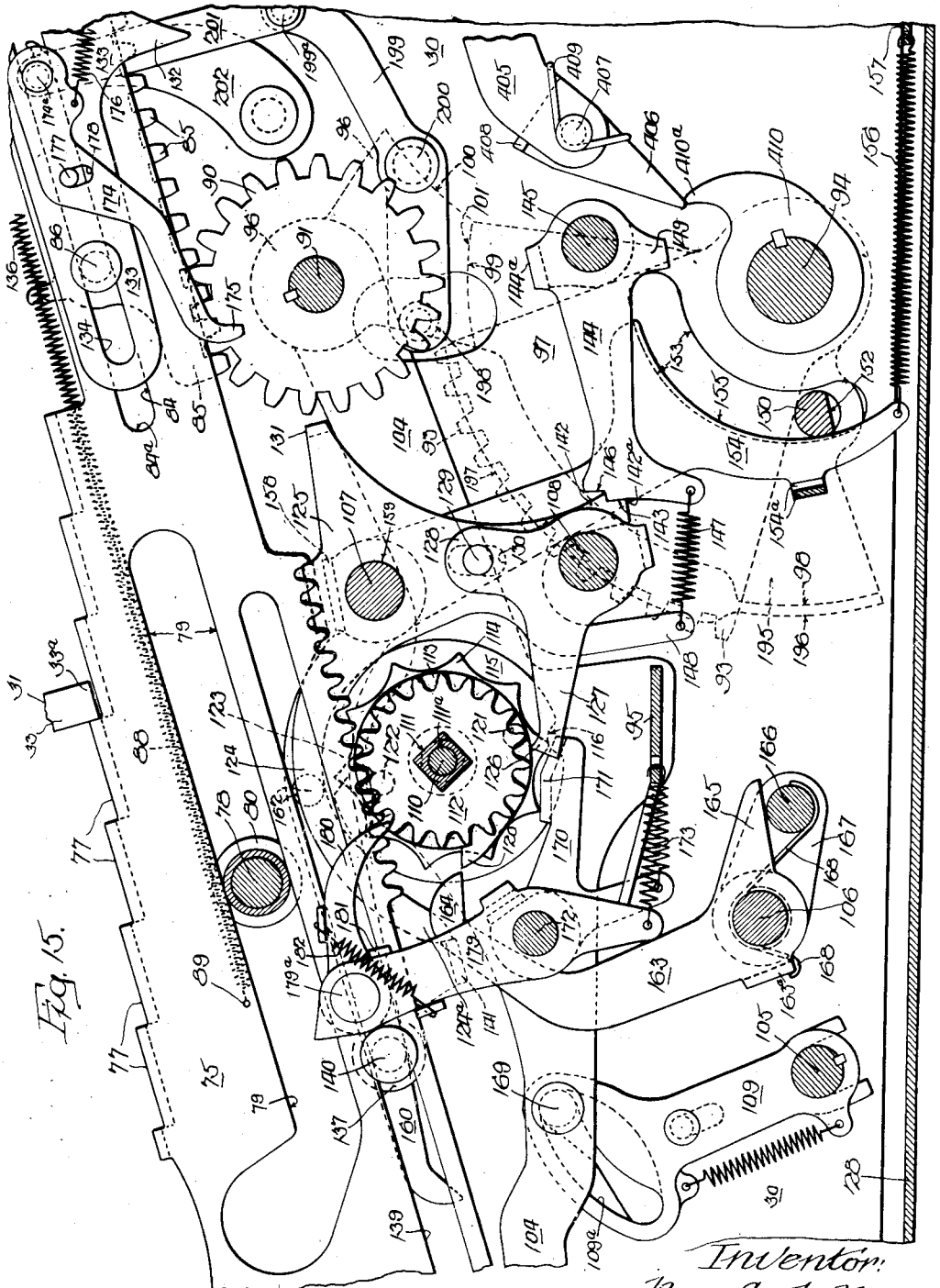
Figure 15 is an enlarged longitudinal detail sectional view similar to Fig. 14, showing the accumulators in meshing engagement with the type bars and with the actuator shaft as being rocked to nearly its entire distance in one direction.
Figure 16:
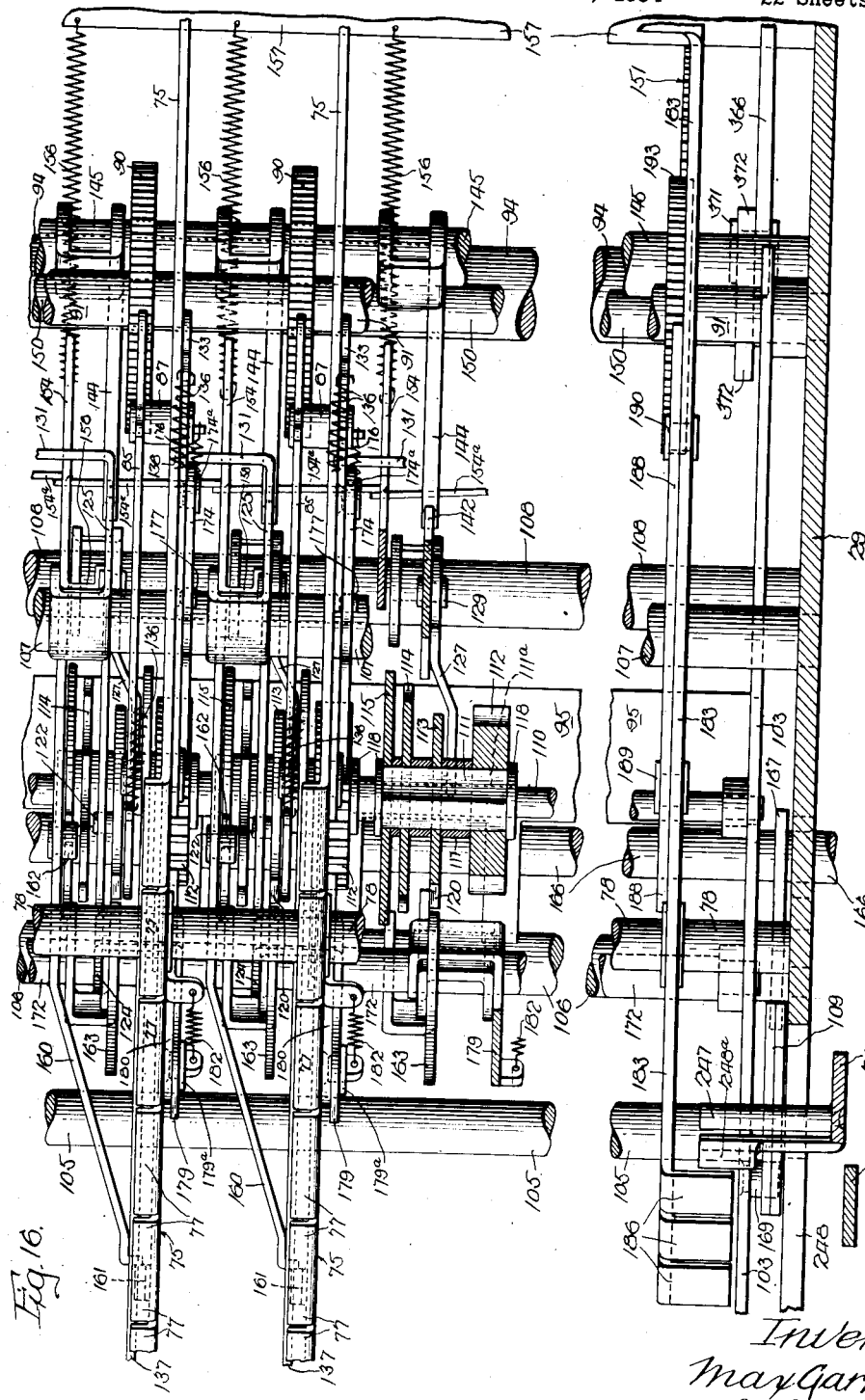
Figure 16 is an enlarged detail fragmentary top plan view partially in elevation and partially in section, illustrating the type bars and accumulators, and also the signal type bar and stop means therefor.
Figure 17:
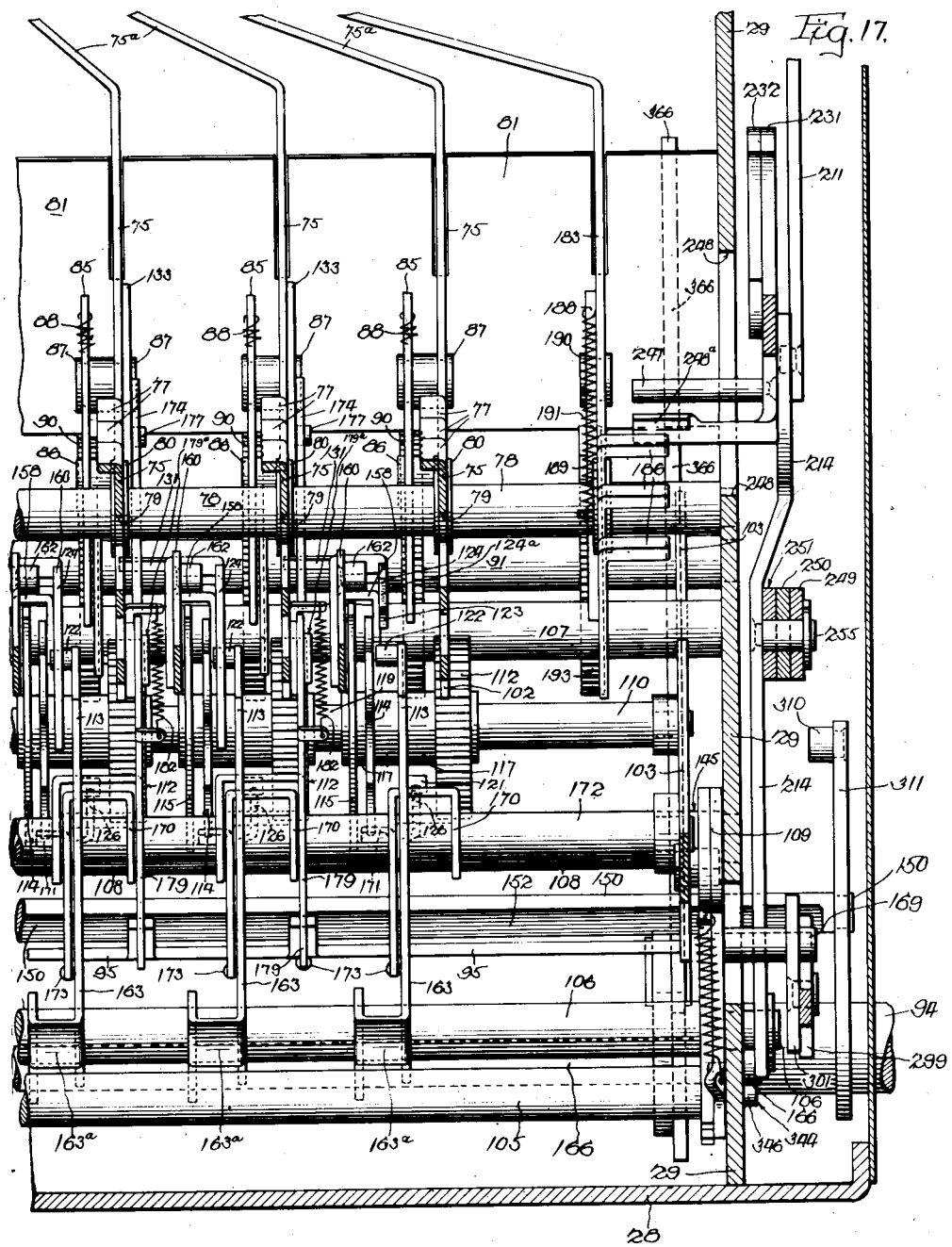
Figure 17 is an enlarged detail cross-sectional view taken on the lines 17—17 of Figs. 2 and 14.
Figure 18:
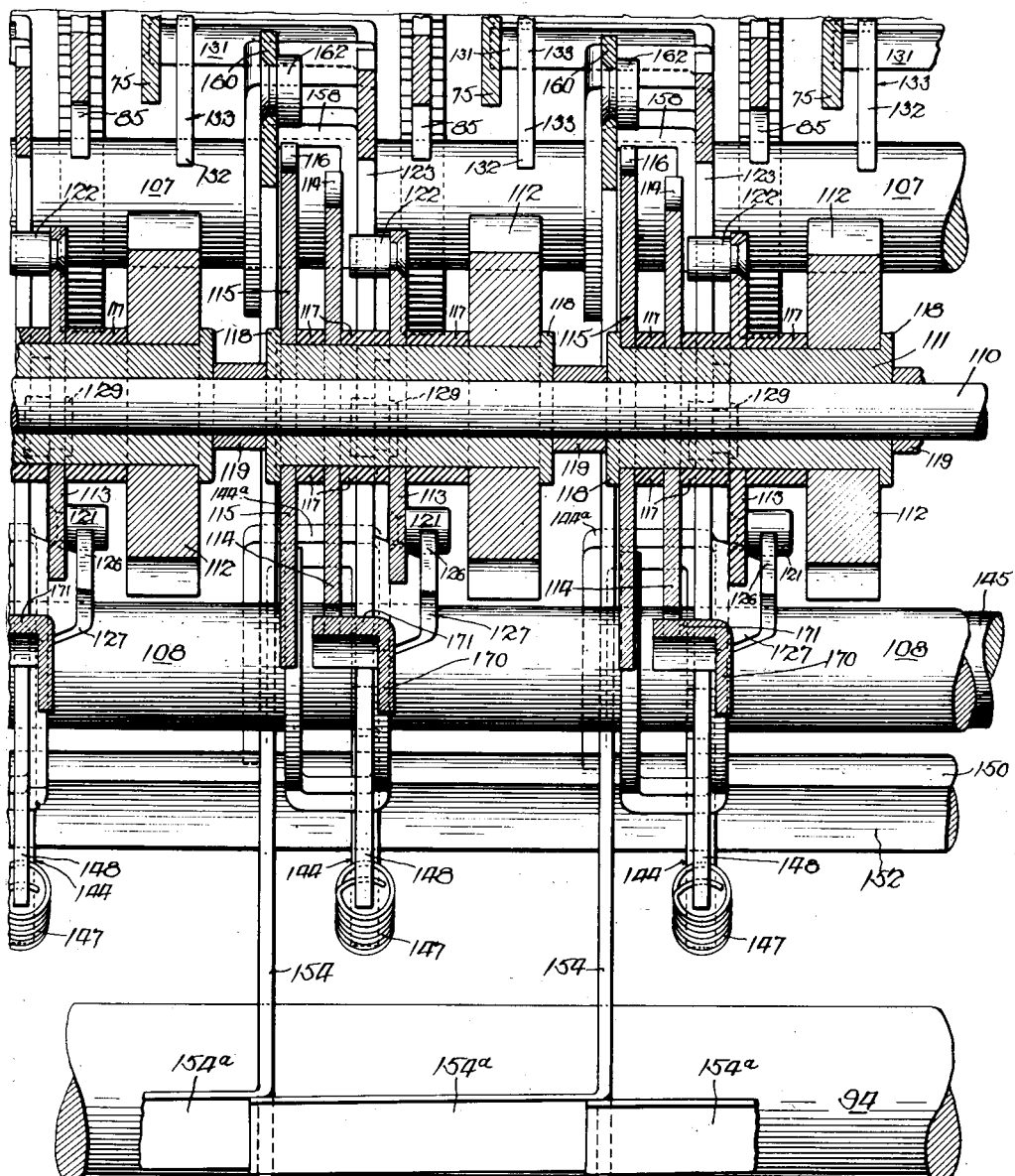
Figure 18 is an enlarged partial detail sectional view taken through the accumulators and type bars, substantially on the line 18—18 of Fig. 14.

The type bars 75 are each provided with an ear 161 (Figs. 3, 4, 5, 13 and 14), which is adapted to be normally engaged by means of a type bar lock arm 160 that has a bearing 158 provided with a bore 159 to pivotally mount the same on a shaft 107 secured in the side plates 29 and 30. The arms 160 each have an integral depending arm 154 that is normally retained in the path of movement of a shaft 150 by means of a spring 156 fixed thereto and to a member 157 fixed to the side plates 29 and 30. The shaft 150 is bodily carried for rocking movements with the actuator shaft 94 in a manner as will be later described. The shaft 150 will effect a movement of the arms 154 to release the arms 160 from the type bars upon the operating stroke of the machine (Fig. 15). When the arms 160 are released from the ears 161, the type bars are then each under the control of a pair of stops 58—65 on the keyboard (Figs. 3, 4 and 5), or under the control of a depressed digit key, the operation of which will be presently described.

Keyboard

The keyboard (Figs. 3, 4, 5 and 11), comprises top and bottom U-shaped members 38 and 39, respectively, that extend between the side plates 29 and 30, and which are adapted to support a group of digit keys 31, arranged in a series of rows or banks and aligned with each other across the entire width of the banks. The top member 38 is provided with a plurality of openings 38a and the bottom member 39 is provided with a plurality of aligned openings 39a, through which openings the stems 33 of the keys 31 extend. The keys 31 are provided with a vertical slot opening 34 through which a relatively small guide shaft 32 extends transversely across each row of digit keys 31, and which shaft is secured to the side walls of the members 38 and 39. The slot openings 34 serve to limit the movement of the keys which are each normally urged upwardly by means of a compression spring 35.

The lower portion of the key stems 33 (Figs. 3, 4 and 11), are each provided with an incline forming cam surface 36 on their front edges that terminate to form a shoulder 37 adjacent the upper edge of the cam surface. The digit keys 31 are each provided with buttons forming finger pieces to depress the keys, and when depressed, the lower ends 33a of the key stems 33 are adapted to coact with the steps 77 of the type bars, and also to extend through and cause the movement of a pair of slides 40 and 48, with the slide 48 controlling the pair of stops 58—65 coacting with the ear 76 at the forward end of the type bar.

A slide 40 is mounted for sliding movements longitudinally of each row of digit keys 31 on the lower member 39 of the keyboard (Fig. 12), and is provided with a plurality of slot openings 41 (Figs. 3, 4 and 11), through which the lower ends 33a of the key stems 33 extend with their cam surfaces 36 engaging the forward edges of the slot openings 41. These slides are relatively narrow and are mounted for sliding movements on a plurality of studs 42, 43, 44 and 45 fixed to the bottom wall 39 of the keyboard, and are each normally urged to retain their slots against the cam surface 36 of the key stems 33 by means of a tension spring 46 secured to a fixed stud 46 and to a stud 47 on each of the slides 40.

The top slides 40 are each provided at their rearward ends (Figs. 3 and 4), with a slot opening 52 to receive an upwardly extending ear 53 of a coacting slide lock 54 pivotally carried on a horizontally extending shaft 55 that is journaled in integrally depending ears 38c of the top member 38 (Fig. 5), at the rearward end of the keyboard.

A slide 48 is mounted for independent sliding movements below and parallel with each slide 40 on the studs 42, 43, 44 and 45, and is also provided with a plurality of slot openings 49, through which the lower ends 33a of the key stems 33 also extend. These slides 48 are normally urged rearwardly in the same manner as the slides 40 by means of a tension spring 50 connected to a fixed stud 44 and to a stud 51 fixed to the slides 48. The slides 48 are each provided at their forward end portions with a slot opening 56 that is adapted to receive a downwardly extending ear 57 of a zero stop member 58 (Figs. 3, 4, and 11), which is mounted for rocking movements on a horizontally extending shaft 59 journaled in the openings 62 in the side walls of the top member 38 at the front end of the keyboard.

The depression of a digit key in any of the banks (Figs. 4 and 11) effects the sliding movement of the coacting slides 40 and 48 in a forwardly direction, and the slide 48 effects the movement of the pair of stops 58—65 at the forward end of the keyboard, while the slide 40 effects a rocking movement of the slide locks 54 on the shaft 55 at the rearward end of the keyboard.

Keys and slides

Upon the depression of a digit key 31, (Figs. 4 and 11), the cam surface 36 thereon will cause a forward sliding movement of the coacting slides 40 and 48 by means of its engagement with the forward edges of the slot openings 41 and 49 thereof. The movement of the slide 40 will rock the slide lock 54 on the shaft 55. While the digit key 31 is being depressed, the cam surface 36 thereof will engage the forward edge of the slot openings 41 and 49 of the aligned slides 40 and 48, and will force them forwardly until the shoulder 37 of the key has passed the lower edge of the slot opening 41 of the slide 40, at which time this slide 40 will be urged rearwardly over the shoulder 37 (Figs. 4 and 11), by its spring 46, thereby withholding the digit key in locked depressed position. While the key is in this depressed position, that portion formed by the cam surface 36 and shoulder 37 will abut the forward edge of the slot opening 49 of the slide 48 and retain the same in advanced forward position against the tension of its spring 50.

Zero and type bar stops

As shown in Figs. 3, 4, 11 and 12, each of the slides 48 has a zero stop 58 connected to the forward end thereof, which is moved thereby as one of the coacting digit keys 31 in the bank, is depressed. The zero stops 58 have a U-shaped formation 60 (Fig. 12), forming a rigid bearing 61 therefor, and are arranged for a free rocking movement on the shaft 59. The zero stop 58 has a hook-like downwardly extending portion 63 that normally depends into the path of the ear 76 of a coacting type bar 75, and it also has a forwardly extending portion 64 adapted to engage and to rock a type bar stop 65.

A type bar stop 65 is arranged to fit within the U-shaped formation 60 of each of the zero stops 58, and is also provided with a U-shaped formation 67, forming a bearing 68 adapted to pivotally support the same on the shaft 59 for rocking movements with or independently of the zero stop 58. The type bar stop 65 is provided with a forwardly extending right-angled portion 69 (Figs. 3, 4, 5 and 12), that projects over the forwardly extending portion 64 of the zero stop 58. The bearings 68 of the type bar stops 65 are each provided with an integral forwardly extending arm 70 (Figs. 3, 4, 11 and 12), which overhangs the right-angled portion 69 of the adjacent type bar stop to the left thereof (Fig. 12), and is retained thereagainst by means of a tension spring 73 that is fixed to an ear 73a on the bearing 68 and to a pin 74 on a partition wall 71, positioned between each pair of stops 58—65. The spring 73 retains the type bar stop 65 for movement with the adjacent zero stop 58 and normally retains their lower ends 66 and 63, respectively, into the path of movement of a type bar 75 mounted for sliding movements below each bank of digit keys.

A zero stop 58 and a type bar stop 65 (Fig. 12) are operatively connected to be controlled by a bank of digit keys by means of a slide 48. The stops are so positioned that the right-angled portion 69 of each of the type bar stops 65 will also underlie the forwardly extending arm 70 of the type bar stop 65 of the adjacent unit of lower order. Each of these units 58—65 is arranged in the same manner, and is held in spaced relation with an adjacent unit 58—65, by means of the partition wall 71 and a spacing washer 72 which guides them in their rocking movements with their lower end portions 63 and 66, respectively, readily engageable with the ear 76 on the coacting type bar 75.

Figure 12:
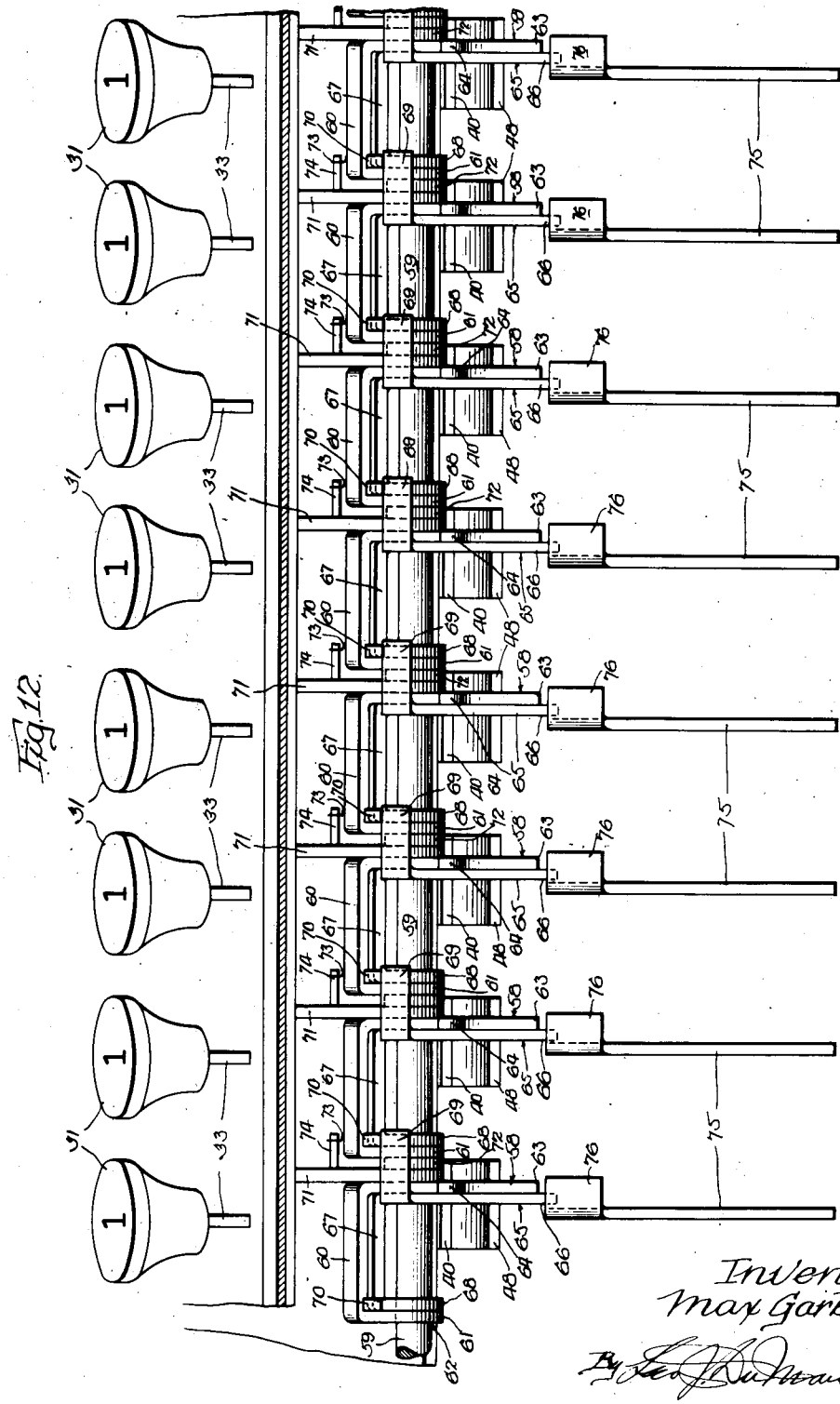
Figure 12 is an enlarged transverse sectional view taken through the front wall of the casing, on the line 12—12 of Fig. 11, illustrating the type bar stops and the zero stops.

A differential movement of the zero stops 58 and the type bar stops 65 will be had upon the movement of a slide 48 which effects a rocking movement of the coacting zero stop 58 and carries the same therewith until the extension 64 thereof engages the right-angled turned portion 69 of the interfitting type bar stop 65, and when engaged, the type bar stop 65 will rock with the zero stop 58 and effect a rocking movement of all of the type bar stops 65 to the right thereof by means of the right-angled portions 69 engaging the forwardly extending arm 70 of the adjacent type bar stop 65 of lower order (Fig. 12). The free movement of the zero stop 58 permits of nearly a complete depression of the key before the type bar stops 65 are moved, which permits of the positive positioning of the zero stop 58 out of the path of the type bar in the bank in which a key has been depressed, before the type bar stop in that bank and all of those of lower order thereof are moved out of the path of their coacting type bar. This makes for a relatively light depression of the keys.

Keyboard locking means

The actuator shaft 94 has a cam segment 195 fixed thereto (Figs. 2, 3, 4, 5 and 19), which has a rise 197 and a dwell 196 that is adapted to engage a follower 198 that is carried at one end of a rocker arm 199, which is pivoted on a pin 200 on the side plate 30. The rocker arm 199 has a link 201 pivoted to its other end on a pin 199a, which link has a pin 203 fixed at its free end that extends through a slot opening 204 in an arm 202, pivotally carried on the side plate 30. The link 201 and the arm 202 are resiliently held together by means of a tension spring 204a, connecting the two. An arm similar to the arm 202 is pivotally mounted on the side plate 29 (Fig. 2), and serves with the arm 202 to support a transversely extending bar 205 that extends in spaced relation with and is adapted to engage the slide locks 54, upon a given movement of the actuator shaft 94. The purpose of the bar 205 is to lock the slide locks 54 (Fig. 4), and lock the slides 40, to prevent the accidental depression of the digit keys and to retain those that have been depressed. As the machine is operated, the actuator shaft 94 is rocked and the cam segment 195 is carried therewith which will cause the follower 198 to be raised by the rise 197 thereof and ride on the dwell 196 and rock the rocker arm 199. This movement of the rocker arm 199 exerts a pull on the link 201, which by means of the spring 204a, exerts a pull on the arms 202 and causes them to rock on their pivots 202a to position the bar 205 thereon, into the path of the slide locks 54. The follower 198 remains on the dwell 196 and retains the bar 205 in the path of the slide locks 54 until the actuator shaft 94 is near its limit of return movement, and at which time, the follower 198 will ride down the rise 197 to restore the arm 205 to its normal position and out of the path of movement of the slide locks 54.

Keyboard lock releasing means

Figure 3:
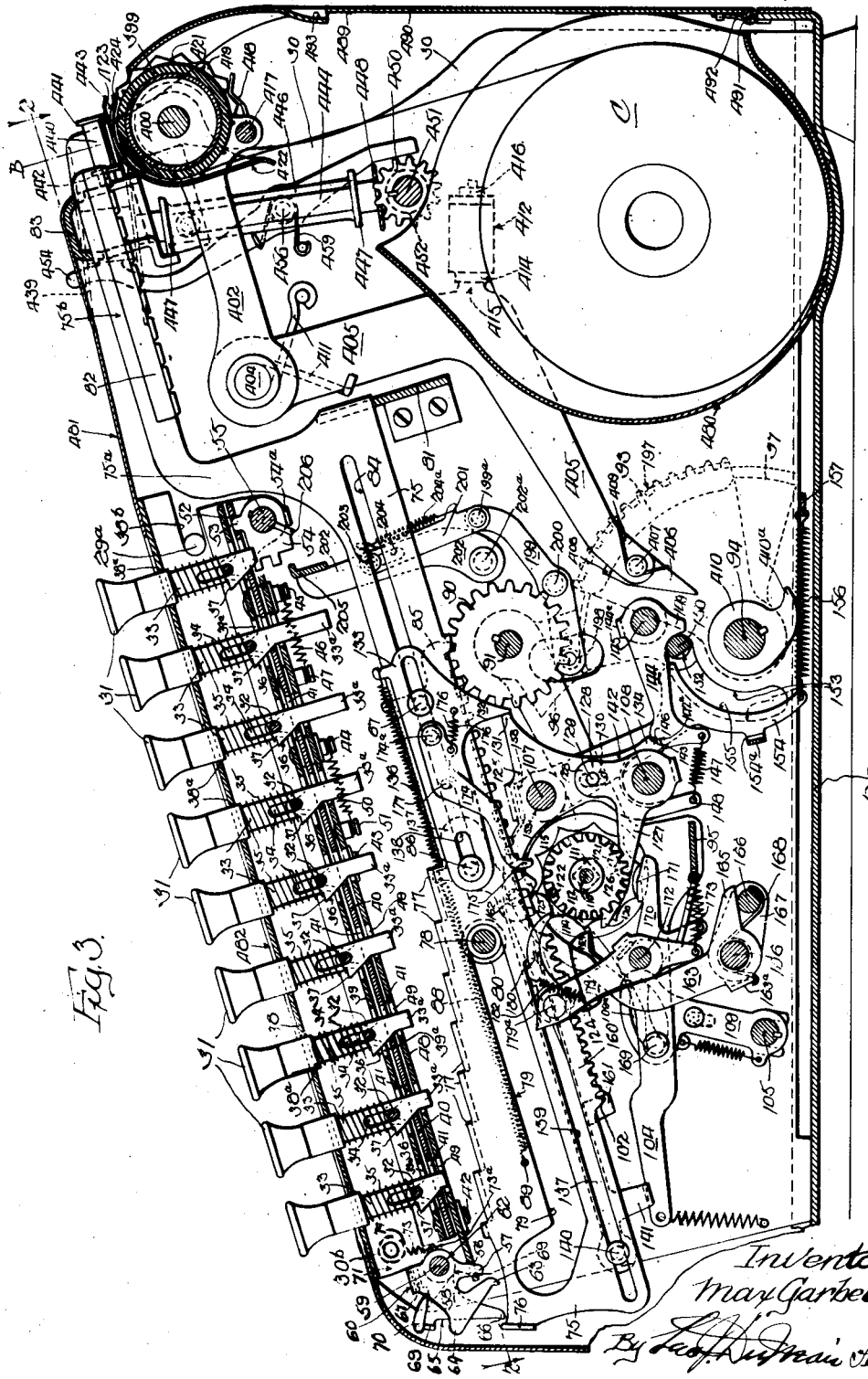
Figure 3 is a medial longitudinal sectional view taken on the lines 3—3 of Figs. 1 and 2.
Figure 4:
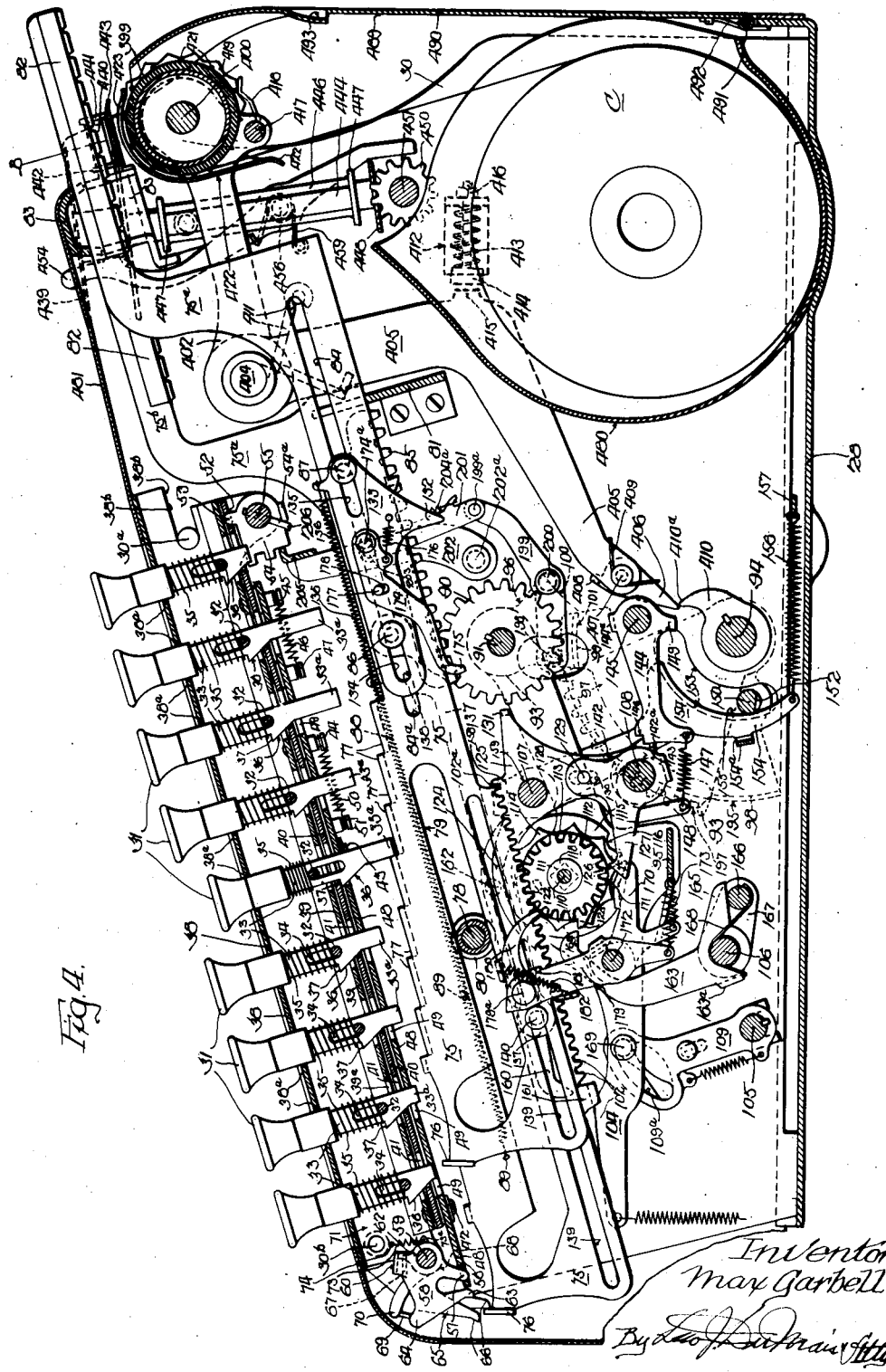
Figure 4 is a medial longitudinal sectional view similar to Fig. 3, showing a changed position and one of the digit keys depressed.
Figure 5:
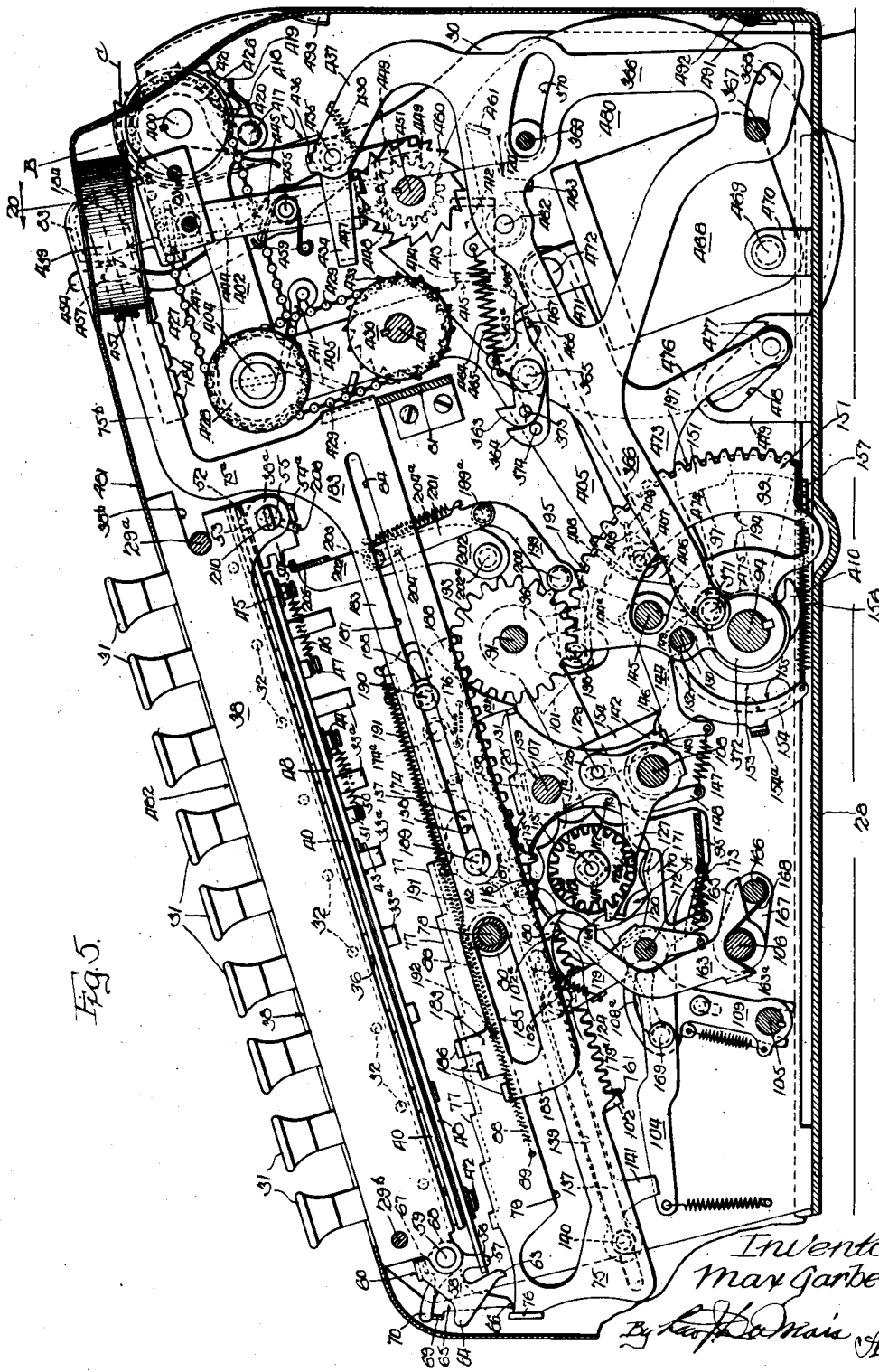
Figure 5 is a longitudinal sectional view taken on the lines 5—5 of Figs. 1 and 2, illustrating the normal or at-rest position of the signal type bar.
Figure 7:
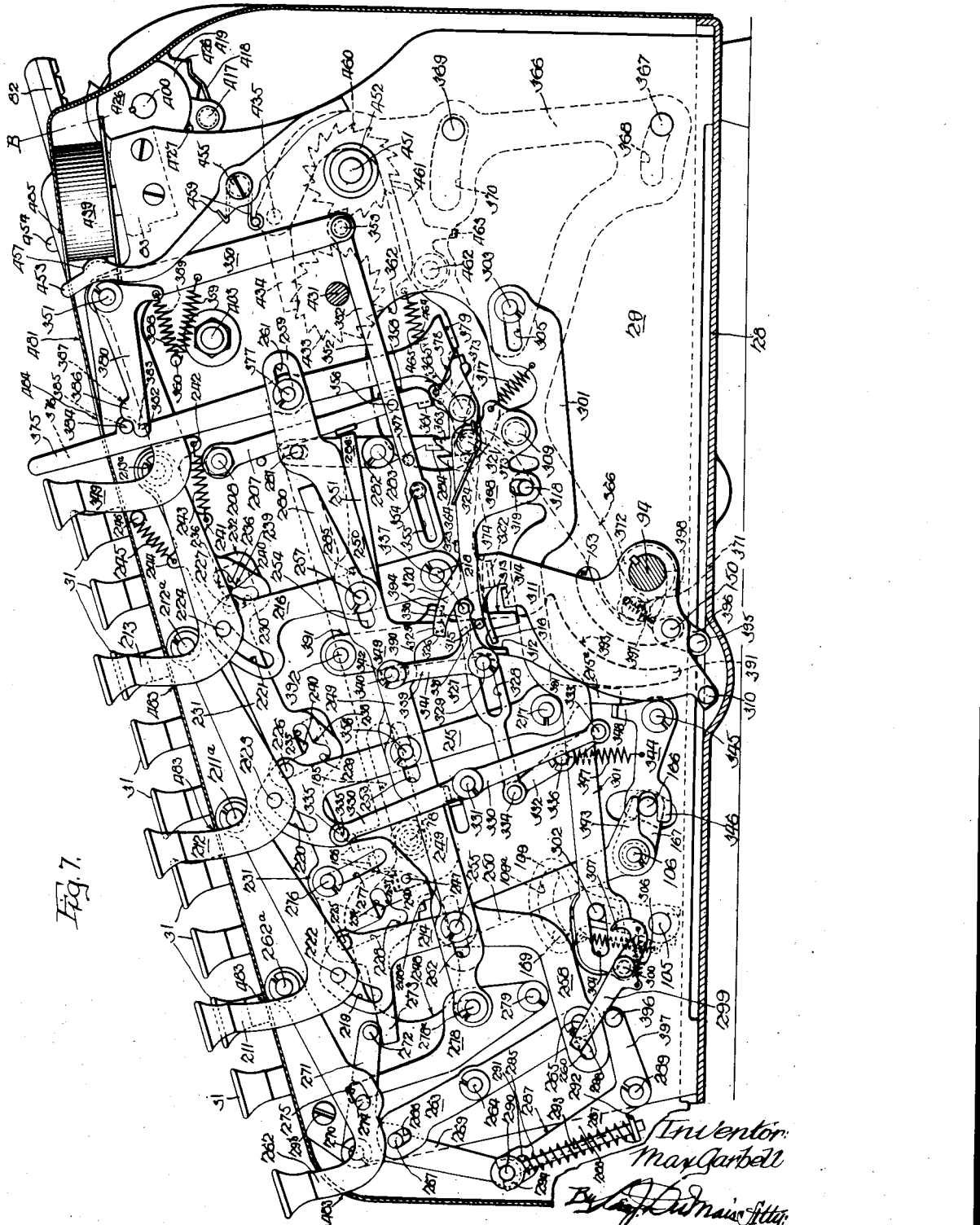
Figure 7 is a longitudinal sectional view similar to Fig. 6, illustrating the non-add control key in depressed position with its associated parts in changed position and also showing the actuator shaft as having been rocked its full distance in one direction.

The slide locks 54 have an ear 54a on their lower edge portions, which ears are adapted to be engaged by a series of pins 206 fixed in aligned relation on the slide lock shaft 55 (Figs. 3, 4 and 5). The shaft 55 is normally adapted to be rocked at near the limit return movement of the actuator shaft 94, and is operatively connected therewith by means of a depending arm 207 (Figs. 6 to 10, inclusive), fixed to a stud shaft 208 (Figs. 21 and 22), that is journaled in and which extends through an opening 362 in the side plate 29, and is provided with a transverse slot 209 adapted to receive a tongue 210 on the adjacent end of the shaft 55. The arm 207 is actuated by mechanism engaging the same upon the return movement of the actuator shaft 94, which effects a forward rocking movement of the slide lock shaft 55 and rocks the slide locks 54 and slide 40 therewith to release the digit keys 31 and permit the depressed keys to be restored to normal positions under the influence of their springs 35. During the forward sliding movements of the slides 40 under the control of the arm 207, the studs 47 thereon will engage to carry the slides 48 therewith to rock the zero stops 58 and type bar stops 65 free of the ears 76 of the type bars 75. The restoring movement of the keys releases the slides 48, which are restored by their springs 50 and which restore the zero stops 58. The arm 207 depends into the path of a pawl 363 that is pivotally mounted on a pin 365 carried on a skeleton frame 366, and which is urged upwardly by a spring 464 with the end 466 thereof engaging the skeleton frame (Fig. 5). The skeleton frame 366 is guided by means of the studs 367 and 369, fixed to the side plate 29, and is connected at 371 to a collar 372 fixed to the actuator shaft 94. The skeleton frame 366 is provided at its lower end portion with an arcuate slot opening 368 which receives the stud 367 fixed to the side plate 29, and the upper portion of the skeleton frame is provided with an enlarged elongated slot opening 370 through which the stud 369 extends to guide the same. As the actuator shaft 94 is rocked forwardly on its operating stroke, the skeleton frame 366 will be carried therewith and is caused to rise by means of the arcuate slot opening 368 riding on the stud 367 and position the pawl 363 under the inturned portion 361 of the arm 207, and by reason of the spring 464, the pawl 363 will be positioned to engage the arm 207 (Fig. 7). As the actuator shaft 94 is rocked rearwardly upon its restoring movement, the skeleton frame 366 will be carried therewith, and the pawl 363 will engage to rock the arm 207 and the slide lock shaft 55 in a counter-clockwise direction (Fig. 10), and cause the pins 206 thereof to engage the ears 54a of the slide locks 54 and rock them therewith, and effect a forward sliding movement of the slides 40 to release the depressed digit keys 31. As the actuator shaft 94 nears the limit of its restoring movement, the pawl 363 will automatically disengage the arm 207 by reason of the downward movement of the skeleton frame 366, effected by the arcuate slot opening 368 therein. At this time, the arm 207 will be spring-urged to normal position by means of its connection with the shaft 55 and slide locks 54, which are restored to their normal positions by means of the springs 46.

The keyboard is carried as a unit on the side plates 29 and 30, respectively, by means of the bifurcated end portions 38b thereon, fitting over pins or studs 29a and 30a fixed in the side plates, and is securely held in supported position by means of set screws 29b and 30b extending through the side plates and threaded into the forward end of the unit.

Error Key

The arm 207 is also operatively connected with an error key 349, which, when depressed, serves to effect a rocking movement of this arm 207 and a counter-clockwise rocking movement of the shaft 55 with the slide locks 54 which carry the slides 40 to release the depressed digit keys when the wrong amount is set up on the keyboard. The error key 349 is in the form of a bell-crank having an integral depending arm 350, and is pivotally mounted on a stud 351 fixed to the side plate 29, and is urged upwardly by a spring 359 fixed thereto and to a pin 360 fixed to the side plate 29. The free end of the depending arm 350 is connected to one end of a link 352 by means of a pin 353 (Figs. 6 to 10, inclusive). The link 352 is provided at its other end with a slot opening 355 through which a stud 354 fixed to the side plate 29 extends to support the same. An inwardly extending pin 356 is secured to the link 352 and is adapted to be brought into engagement with an ear 358 on the arm 207, as the error key is depressed to effect a rocking movement of the arm 207 to clear the keyboard. The error key 349 also coacts with an arm 282 that is operatively connected to a control key mechanism to release an incorrect control key when depressed, as will be later described.

The pawl 363 is rendered inoperable with the arm 207 by means of a repeat lever 375 that is adapted to be manually positioned at the will of the operator.

Digit repeat lever

The repeat lever 375 is pivotally carried on a stud 377 (Figs. 6 to 10, inclusive), fixed to the side plate 29 and has its lower end portion provided with a cam surface 378 that terminates into a dwell 379 which is adapted to be positioned into the path of a pin 373 fixed to the pawl 363 (Fig. 10), for effecting a downward rocking movement of the pawl to prevent its engagement with the arm 207 as the actuator shaft 94 is rocked, during the operation of the machine. The repeat lever 375 will be held in the position to which it is moved by means of a retaining member 380 pivotally carried on the stud 351 adjacent the error key, and is provided with an ear 386 at its free end 382, over which a pin 384 on the lever 375 is adapted to ride as the lever 375 is moved. The retaining member 380 has a tension spring 388 fixed thereto and to the pin 360 on the side plate 29, which constantly urges the retaining member into engagement with the pin 384 on the lever 375 to retain the same in normal or operative position.

A separate repeat lever 376 is employed, and is adapted to be used when it is desired to make repeat operations of a control key set-up, which will be fully described with the control keys.

Platen mechanism

A platen 399 is arranged to move into and out of the printing line B (Figs. 2, 3, 4, 5, 6, 7 and 8), and to contact the type of the type bars that have been positioned in the printing line. The contact of the platen with the type bars is an impact caused by tripping mechanism operable therewith at near the limit forward movement of the actuator shaft 94. After the impact, the platen is restored to its normal position and withheld in spaced relation with the type bars, which permits of the free restoring of the type bars to their normal at-rest positions.

The platen roll 399 is mounted for rotating movements on a platen shaft 400 journaled in the free ends of a pair of arms 401 and 402, fixed to the studs 403 and 404, respectively (Fig. 2), which are journaled in the side plates 29 and 30. The stud 404 has a depending arm 405 fixed thereto that extends toward the actuator shaft 94 (Figs. 3, 4 and 5), and is provided with a dog 406 pivotally carried on a pin 407 at its free end portion. The dog 406 has an ear 408 which overlies the top edge of the arm 405 and is yieldingly held thereagainst by means of a torsion spring 409 to limit its movement in one direction. The dog 406 extends into the path of an entension 410a on a cam 410 fixed to the actuator shaft 94, and is adapted to be engaged thereby as the actuator shaft 94 is rocked forwardly. The arm 405 is normally urged rearwardly by means of a torsion spring 411, which has its body portion coiled around the stud 404 and one end thereof engaging the arm 405, and its other end secured to the side plate 30. The arm 405 is limited in its rearward movements by means of a cushioning device 412 that is provided with a compression spring 413 therein (Fig. 4), which normally holds a plunger 414 in readily engageable position with an extension 415 on the arm 405. The cushioning device 412 normally retains the arm 405, which in turn, retains the arms 401 and 402 with the platen 399 in retracted position with respect to the type bars.

The impact of the platen against the type bars takes place at near the limit forward movement of the actuator shaft 94 when the dwell 99 of the Geneva locking member 97 is in sliding engagement with the surface 101 of the Geneva lock 96, and at which time the extension 410a of the cam 410 is brought into engagement with the dog 406 to rock the arm 405 and platen 399 a given distance. As the extension 410a passes beyond and disengages the dog 406, it permits the platen to be spring-impelled by means of the spring 411 for an impact against the selected type of the type bars. The extension 415 of the arm 405 engages the cushioning device 412 simultaneously with the impact of the platen 399 against the type bars which serves to cushion the impact of the platen during its printing operation. The cushioning device 412 also retains the platen in spaced relation with the type bars after the impact. The plunger 414 extends through the device 412 and is provided with a thread at its free end portion that has a nut 416 threaded thereon, for adjusting the position of the plunger and the tension of a spring 413 coacting therewith, to vary the impact desired of the platen against the type of the type bars set up in the printing line B.

To permit the positioning of the type bars in the printing line B prior to the impact of the platen thereagainst, the cam 410 is fixed to the actuator shaft 94 in a manner to require nearly a full forward movement of the shaft 94, before the extension 410a thereof engages the dog 406 to rock and trip the arm 405 and platen 399.

The printing line B is a short distance rearwardly of the ends of the type bars, so that after an impression has been made of the type positioned in the printing line, the type bars will be restored to their normal positions upon the return movement of the actuator shaft 94 and render the platen and the amount imprinted thereon visible to the operator.

A bar 417 (Figs. 3, 4 and 5) has its ends secured to the free ends of the platen arms 401 and 402 below the platen 399, and carries a spring pawl 418 adapted to engage a detent wheel 419 secured to the platen shaft 400, and which serves as a line-space regulator as the platen 399 is rotated. The pawl 418 offers sufficient resistance to the detent wheel 419 to hold the platen 399 in its rotated adjusted position, but permits of the turning movements thereof by its yielding tension with the detent wheel 419.

Paper feed mechanism

The platen roll 399 has a disc 420 fixed to each end thereof (Fig. 2), which is provided with a plurality of relatively short sharp teeth 421 on their peripheries, that extend outwardly of the surface of the platen 399 and cooperate with a guide 422, which encloses a portion of the platen roll 399, and which serves to guide a record strip C therearound and outwardly of the machine. The teeth 421 of the discs 420 perforate the record strip C adjacent each side edge thereof and positively feed the strip with the platen, eliminating the use of feed rolls. The guide 422 is provided with an elongated slot opening 423 through which the type of the type bars is adapted to pass while the platen is taking an impression thereof. The forward or outer edge of the guide 422 is provided with a serrated edge portion 424 against which the record strip C may rest when it is desired to tear off a portion of the extending end thereof. The guide 422 is provided with integral inturned flanges 425 (Fig. 2) for supporting the same on the platen shaft 400 around the platen, and has the arms 422a and 422b extending outwardly of each end thereof, which are secured to the arms 401 and 402, respectively.

The platen shaft 400 extends outwardly of the arm 401 (Figs. 2 and 5), and has a chain wheel 426 fixed thereto that is provided with a plurality of peripheral pocket formations which are adapted to be engaged by a ball-like chain 427 which extends therearound and around one portion of a double chain wheel 428 that is loosely supported on the stud shaft 403. A ball-like chain 429 extends around the other portion of the wheel 428 to a chain wheel 430, which is fixed to a stud shaft 431 that is carried in the side plate 29, and which extends outwardly on the right-hand side of the machine and to which stud shaft, a twirler knob 432 is secured. The shaft 431 has a ratchet-wheel 433 fixed thereto that is adapted to be engaged by a pawl 434 which is carried on a pin 435 fixed to the extension 437 of the skeleton frame 366. The pawl 434 is normally urged by a spring 438 fixed thereto and to the extension 437 and is limited in its movement by means of an ear 436.

As the actuator shaft 94 is rocked forwardly (Fig. 7), the skeleton frame 366 and pawl 434 will be carried thereby, and the pawl 434 will be positioned to engage the ratchet-wheel 433. Upon the reverse movement of the actuator shaft 94 and skeleton frame 366, the pawl 434 will engage the ratchet-wheel 433 and cause a partial turn thereof and a clockwise turning movement of the platen roll 399 through the chains 429 and 427. The rotation of the platen 399 causes the feeding of the record strip C and a step-by-step movement thereof from a supply roll, as the machine is operated. The supply roll of the strip C is retained in a container 480 fixed to the bottom wall 28 and is curved to nearly conform with the outer periphery of the supply roll to provide a surface contact therefor which tends to resist the turning movements of the roll (Figs. 3 and 4).

Ribbon feed mechanism

An inking ribbon is carried on a pair of spaced apart spools 439—439 (Fig. 2), with the ribbon thereof extending over the platen 399 and outwardly of and below the printing face of the type bars 75.

To guide the ribbon over the platen roll 399, a pair of studs 440—440 are provided (Figs. 2 and 20), which are fixed to the comb 83 and extend outwardly and rearwardly thereof, and are each provided with a pair of spaced apart guide flanges 441 and 442, respectively. A relatively light spring clip 443 is also secured to the comb 83 below each of the studs 440 and these clips extend outwardly thereof with their body portions engaging the guide flanges 441 and 442, and form a pocket therebetween to guide the ribbon. The extending portions of the spring clips 443 are for the purpose of depressing them to insert or remove the ribbon guided by the studs 440—440.

Each ribbon spool 439 is carried on a substantially vertical shaft 444 supported for turning movements in the brackets 445 and 446, respectively (Figs. 2, 4, 5 and 20), which are secured to the inner side of the side plates 29 and 30. The brackets 445 and 446 are each provided with inwardly extending ears 447 (Fig. 20), at their upper and lower ends, in which the ribbon spool shafts 444 are journaled and which are each provided with a gear 448 on their lower ends which are adapted to be alternately engaged by the gears 449 and 450, respectively, which are fixed for turning movements with a transversely extending ribbon feed shaft 451 journaled in the side plates 29 and 30. The shaft 451 has a cam 452 fixed adjacent each end thereof, which cams are each adapted to be intermittently engaged by the lower ends of ribbon follower arms 453 and 454 respectively, which are pivotally mounted for rocking movements on the studs 455 and 456 fixed to the side plates 29 and 30, respectively. As shown in Figs. 6 to 10, inclusive, and 20, the ribbon follower arms 453 and 454 extend upwardly along the outer side of each ribbon spool 439, and are each provided near their upper end portions with ribbon engaging portions 457 and 458, respectively, which are urged by means of the torsion springs 459—459 fixed to the followers, and which have their other ends fixed to the side plates 29 and 30, respectively.

The ribbon feed shaft 451 has a ratchet-wheel 460 fixed thereto, which is adapted to be engaged by a pawl 461 (Figs. 5 and 7), pivotally carried by a pin 462 on the skeleton frame 366, and is urged upwardly by means of a spring 464 fixed thereto and to a pawl 364. The pawl 364 is carried adjacent the pawl 363 by the pin 365 and has an ear 467 thereon engaging the skeleton frame to retain the same readily engageable with a rocker arm 282 as will be later described. The pawl 461 is limited in its upward movements by an ear 463 thereon engaging the skeleton frame and is adapted to engage the ratchet-wheel 460 and cause a partial turning movement thereof, upon the restoring movement of the actuator shaft 94.

The follower arms 453 and 454 (Fig. 20), are adapted to intermittently engage the cams 452, as one or the other of the ribbon spools 439—439 become filled, thereby providing means for feeding the inking ribbon and reversing the same for movement in the other direction, when exhausted. The intermittent engagement of the followers with the cams 452 will cause an endwise shifting action of the shaft 451 during its rotating movements, and cause either of the gears 449 or 450 fixed thereon, to be brought into meshing engagement with its companion ribbon spool shaft gear 448. The gears 449 and 450 on the ribbon feed shaft 451 are arranged inwardly of the ribbon spool shafts 444, and the sliding endwise movement of the shaft in one direction or the other will cause the ribbon spool shafts 444 to be alternately driven, and provide an automatic reversing of the ribbon feed while the shaft 451 is rotated in one direction.

*Signal type bar*

Adjacent the first type bar 75 (to the right as viewed from the front of the machine), is a signal type bar 183 (Figs. 2, 5, 16 and 17), which has the signal type 184 secured thereto, indicating "non-add," "total," "sub-total," and "subtract." This signal type bar 183 is provided with an elongated slot opening 185 through which the shaft 78 extends, and which shaft has a flanged roller 80 thereon to guide the signal type bar at its forward end. The rearward end of the signal type bar is also guided in the type bar comb 81, and has a lateral extension, which is guided in the rear comb guide 83. The signal type bar 183 is guided in the same manner as the type bars 75, but is movable a lesser distance, and is provided on its forward top edge with a plurality of steps forming stops 186, which are adapted to be selectively engaged by a stud 247, and with a shoulder 248a normally in the path of the first stop (Figs. 2 and 7 to 10, inclusive). The stud 247 and shoulder 248a are carried on a member 231 which is under the control of control keys which effect its positioning and which positions the stud 247 into the path of the steps 186 to limit the rearward movement of the signal type bar at three given positions with the roller 80 providing a stop for the fourth position of its rearward movement, as will be later described. The signal type bar 183 is also provided with an elongated slot opening 187 in which a rack 188 is slidably mounted by means of the pins or studs 189 and 190, respectively, fixed to each end of the rack 188. A relatively long tension spring 191 is connected to the rack 188 and to a pin 192 on the signal type bar 183 and serves to yieldingly retain the pin 189 of the rack against the forward end 187a of the slot opening 187 in the signal type bar.

*Signal type bar driving means*

The rack 188 of the signal type bar 183 (Figs. 2 and 5), is in meshing engagement with a gear 193 which is loosely carried on the shaft 91 and which gear is in meshing engagement with a segmental gear 151 fixed to the actuator shaft 94. The segmental gear 151 is provided with an arcuate slot opening 194 to permit of its free movement around a shaft 145. As the signal type bar 183 is normally locked against movement by means of the shoulder 248a of the member 231 (Fig. 6), which is in the path of the first stop 186 thereof, the rack 188 is carried for sliding movements in the slot opening 187 of the signal type bar upon each operating stroke of the actuator shaft 94. When this signal type bar is released by movement of the member 231 which carries the shoulder 248a thereon, out of the path of the first stop 186 by depressing a control key, as will be presently described, the signal type bar will then be free to be driven with its rack 188 by means of the spring 191 until arrested by the stop 247 which is selectively positioned into the path of one of the stops 186 to determine the positioning of the character corresponding to the control key depressed.

*Control keys*

As shown in Figs. 6 to 10, inclusive, there is a bank of control keys comprising the non-add key 262, the total key 211, the sub-total key 212 and the subtraction key 213. The error key 349 and the pair of repeat levers 375—376 are also aligned with these control keys. The depression of a control key moves the member 231, which determines the distance of movement of the signal type bar 183 (Fig. 5), to position a type thereof, in the printing line B, indicating the control key depressed. The signal type bar 183, when moved upon the operation of the machine, is controlled by the positioning of the member 231, which member is differentially positioned by the "non-add," "total," "sub-total" and "subtraction" keys. This member 231 is mounted at one end on a stud 213a projecting from the side plate 29, and has the shoulder 248a and stud 247 fixed to its forward end and which extend inwardly toward the signal type bar 183, through an opening 248 in the side plate 29.

When the machine is conditioned for addition, the member 231 is in the position shown in Fig. 6. As the machine is operated, the signal type bar 183 is urged toward the printing line B, but is withheld from movement by means of the first stop 186 thereon engaging the shoulder 248a, and it will not print a character during this operation of the machine. When the parts are in normal position (Fig. 6), the member 231 is normally urged upwardly by means of a spring 245 fixed to an ear 244 thereon and to a stud 246 on the side plate 29.

If a subtraction operation is performed, it is desirable to have a suitable character printed on the record strip to indicate it. The member 231 is operatively connected to the subtraction key 213 by means of a lever 216, which is pivoted to a stud 218 on the side plate 29. As shown in Figs. 6 and 23, the member 231 is provided with a vertical slot opening 230 and a horizontal slot 236 communicating therewith, forming a cam shoulder 239. The lever 216 has a stud 227 which normally rests in the vertical slot opening 230 and is also provided with a cam slot 221 to receive a pin 224 fixed to the subtraction key 213, which is pivoted on the stud 213a adjacent the member 231. It will be obvious that, when the subtraction key 213 is depressed, the lever 216 is rocked clockwise and the pin 227 thereon will ride over the cam 239 and rock the member 231 downwardly with its stud 247 into the path of the third stop 186, so that, upon the operation of the machine, the signal type bar is moved three steps to position the type representing "subtraction" to the printing line B.

When a sub-total is taken, a corresponding character is also printed on the record strip. A lever 215 is pivoted to the side plate 29 on a stud 217 and has a pin 226 fixed thereto, which normally rests in a vertical slot opening 229 (Fig. 6), in the member 231, and which slot opening communicates with a horizontal slot 236 forming a shoulder 238. The lever 215 is also provided with a cam slot 220 to receive a pin 223 fixed to the sub-total key 212 which is pivoted to the side plate 29 on a stud 212a. When the sub-total key is depressed (Fig. 10), the lever 215 is rocked clockwise to force the pin 226 over the shoulder 238 to depress the member 231 and position the stud 247 thereon into the path of the second stop 186 of the signal type bar, to present the type representing "sub-total" to the printing line.

When a total is taken, a suitable character is likewise printed on the record strip. A lever 214, which is pivotally carried on a shaft 106 (Fig. 6) has a pin 225 fixed thereto that normally rests in a vertically extending slot opening 228, which has a slot 234 communicating therewith, which forms a shoulder 237 in the forward end of the member 231. This lever 214 is also provided with a cam slot 219 to receive a pin 222, fixed to the total key 211 that is pivotally carried at 211a on the side plate 29. When the total key is depressed (Fig. 8), the lever 214 will be rocked clockwise and urge the pin 226 thereof over the cam 237 and rock the member 231 downwardly with the stud 247 thereof into the path of the first stop 186 to limit the movement of the signal type bar to present the character representing "total."

A character is also printed for the non-add key 262, which key is pivotally carried at 262a on the side plate 29 and is operatively connected to effect a downward rocking movement of the member 231 through an arm 271 of a bellcrank 269 (Figs. 6, 7, 8, 9 and 10), which is pivotally carried on a stud 270 fixed to the side plate 29. The non-add key 262 is provided with a slot opening 275 therein into which a pin 274 extends and which is fixed to the bell-crank arm 271. The arm 271 also carries a pin 272 at its free end which normally overlies an extension 273 of the member 231.

As shown in Fig. 7, when the non-add key 262 is depressed, the arm 271 will be rocked thereby and cause the pin 272 thereon to engage the extension 273 of the member 231, and rock this member 231 downwardly and position the stud 247 thereon below the stops 186 of the signal type bar 183 and permit the signal bar to be carried by the driving mechanism the full distance permitted by the length of the slot opening 185 therein.

The depression of each of the control keys will vary the distance of movement of the member 231 on the stud 213a which effects the different positioning of the stud 247 thereon with respect to the stops 186 on the signal type bar 183.

A member 232 (Figs. 6 to 10, and 24), which is pivoted on the stud 213a adjacent the member 231, is adapted to coact with this member 231 to form locking means for the depressed control keys and to also lock those which have not been depressed, against accidental depression. The member 232 is provided with a depending ear 241 to which a spring 243 is attached, and which has its other end attached to a depending ear 242 extending from the member 231. This spring 243 urges the member 231 upwardly and the member 232 downwardly, forming a scissor-action between the two. The two members 231 and 232 are guided at their forward ends by a stud 276 fixed to the plate 29 and which extends through slot openings designated as 277 in each of the members, and these members 231—232 are normally urged in raised position by the spring 245 fixed to the ear 244 of the member 231. This spring 245 normally retains the lower edges of the vertical slot openings 228, 229 and 230 of the member 231 against the pins 225, 226 and 227 of the levers 214, 215 and 216. The member 232 is provided at its free end portion with a downwardly directed V-shaped portion 240 (Figs. 6 to 10, and 24), and with enlarged companion slot openings 235a and 236a, respectively, aligned with the slot openings 229—235 and 230—236, respectively, of the member 231, and are each provided with a downwardly directed V-shaped portion 240, which extends toward the cam portions 238 and 239 in the member 231.

As one of the control keys 211, 212 or 213 is depressed, the corresponding vertical lever 214, 215 or 216 is rocked clockwise as above described, and as its pin 225, 226 or 227 rides over the coacting cam 237, 238 or 239, it will depress the member 231, and the pin will also engage the coacting V-shaped downwardly projecting portion 240 of the member 232 and cause the same to rock upwardly on its pivot 213a against the tension of the spring 243, until the pin has passed this V portion, and at which time, the spring 243 will force the member 232 downwardly and retain the pin with the control key depressed. The downward positioning of the member 231 effects a misalignment of the slots therein with the remaining pins of the levers coacting with the control keys that have not been depressed, and prevent their depression.

When the non-add key 262 is in its normal position (Fig. 6), and one of the other control keys is depressed (Figs. 8, 9 and 10), a member 278 is arranged to prevent its accidental depression, as will be later described.

*Shift members controlled by control keys*

Each of the vertical levers 214, 215 and 216 (Figs. 6 to 10, inclusive), carry a stud 255, 256 and 257, respectively, on which studs three shift members 249, 250 and 251, respectively, are mounted for reciprocating movements with and independently of each other. The shift member 249 is provided with slot openings 252, 253 and 254 therein, through which the studs 255, 256 and 257 extend. The member 250 is provided with slot openings 252a, 253a and 254a that are aligned with the slot openings 252, 253 and 254 of the shift member 249, and which slot openings also receive the studs 255, 256 and 257. And the member 251 is provided with slot openings 252b and 253b that are aligned with the slot openings 252 and 253, and which receive the studs 255 and 256. This shift member 251 is provided with a relatively long slot 285 through which the stud 257 extends, as will be later described with the subtraction key. The shift member 250 extends outwardly of each end of the shift members 249 and 251 providing portions 258 and 259 at the forward and rearward ends, respectively, which are provided with slot openings 260 and 261, respectively, that extend parallel therewith. The slot opening 261 receives the stud 377 and serves to guide the member 250 thereon adjacent the repeat lever 315.

The slot 260 in the forward extending end 258 of the shift member 250 receives a pin 265 carried on the lower end of a rocker arm 263, which is pivoted on a stud 264 fixed to the side plate 29, and this rocker arm has a slot opening 266 at its upper end which receives a pin 267 fixed to a depending leg 268 of the bell-crank 269 pivoted on the stud 270, and which bell-crank is operatively connected to the non-add key 262, as above described.

When the subtraction key 213 is depressed, the lever 216 is rocked clockwise and the stud 257 thereon will carry the shift members 249 and 250 rearwardly or to the right, but the stud 257 will ride in the slot 285 of the shift member 251 without effecting its movement, which permits the arm 207 to remain in normal position with the depressed keys 31 locked by the slides 40, and which keys indicate the value of the amount to be subtracted.

Figure 8:
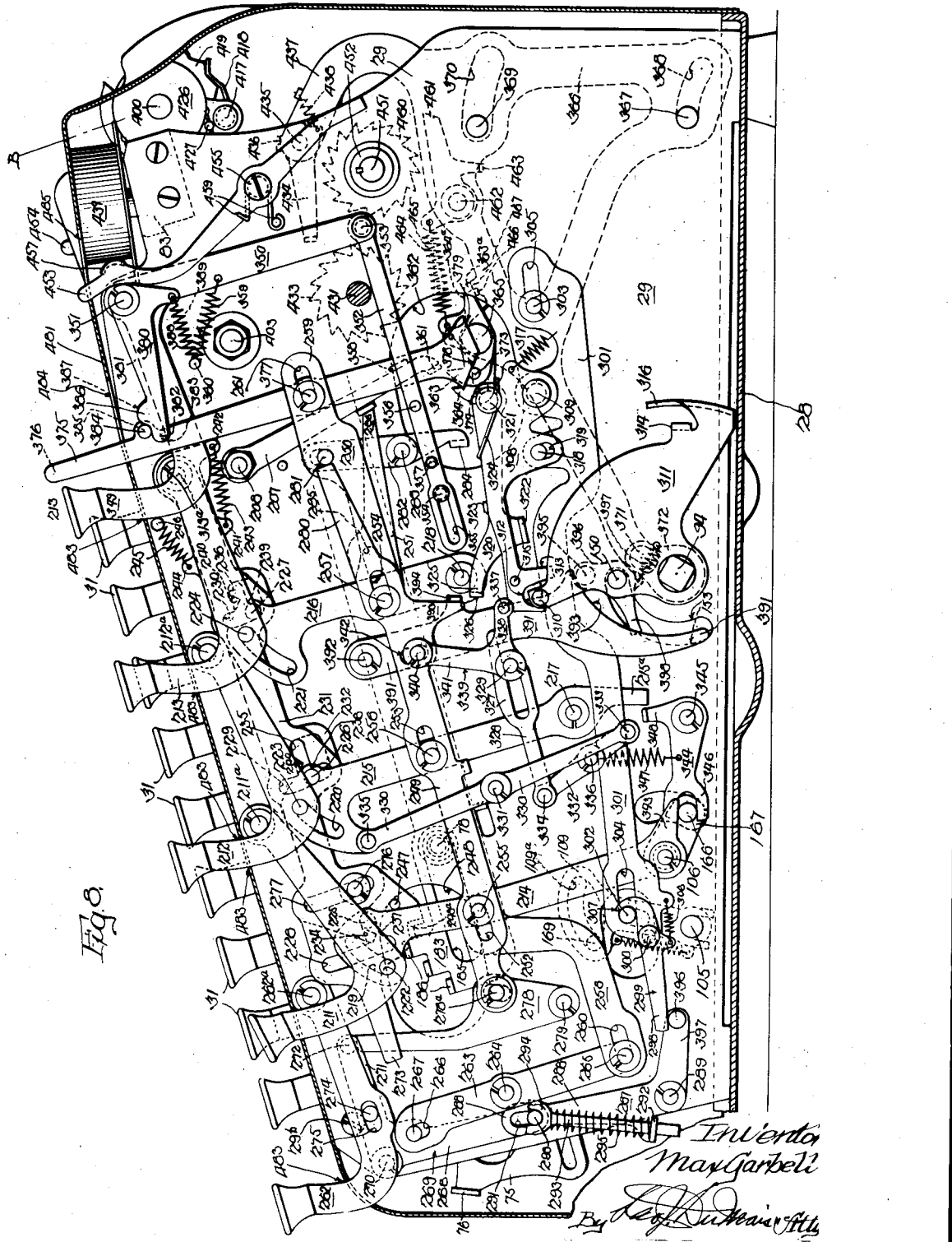
Figure 8 is a longitudinal sectional view similar to Fig. 6, illustrating the total control key in depressed position with its associated parts in changed position and also showing the actuator shaft as being in its normal at-rest position.
Figure 9:
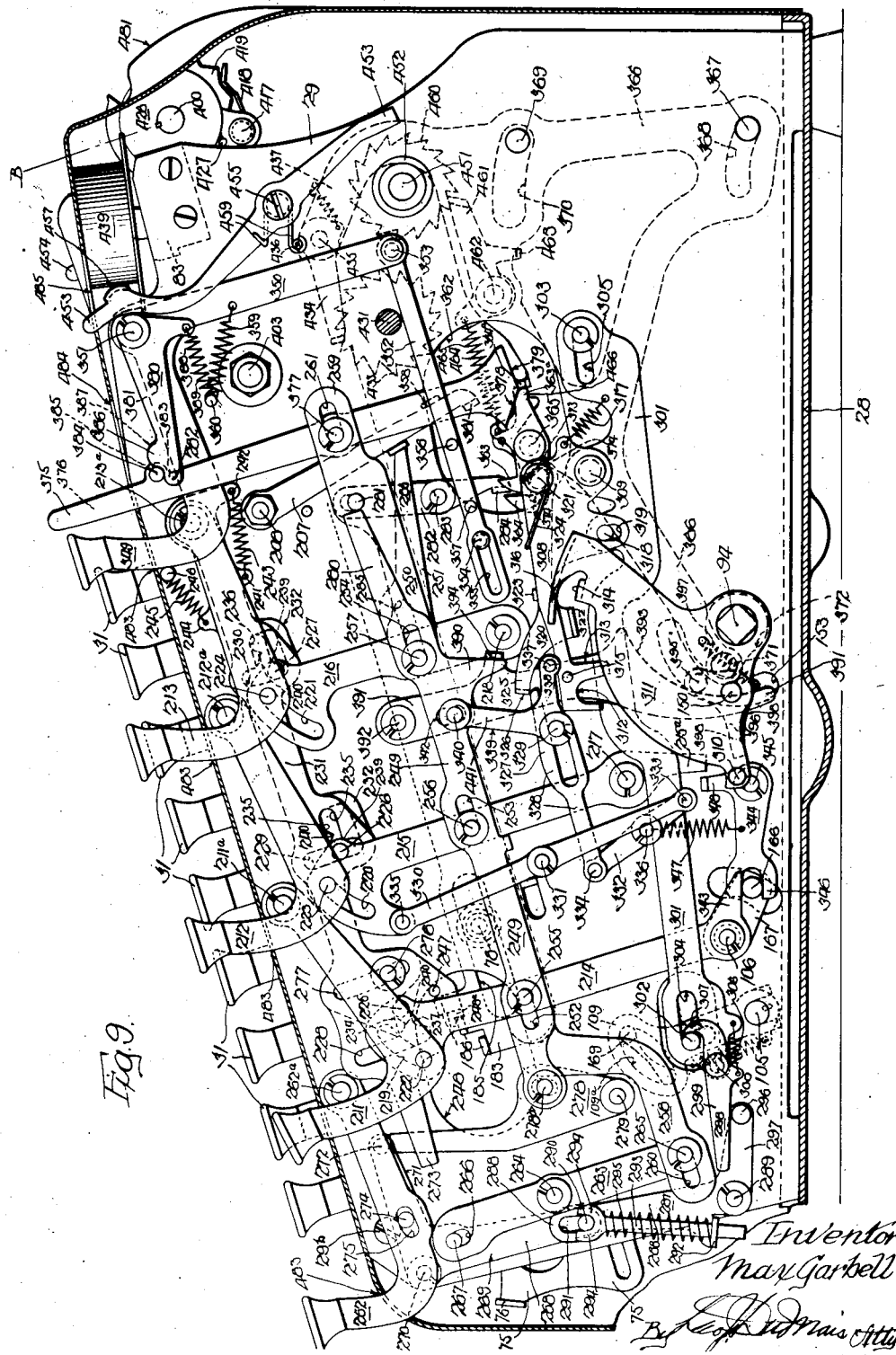
Figure 9 is a longitudinal sectional view similar to Fig. 6, illustrating the total control key in depressed position with its associated parts in their changed position and also showing the actuator shaft as having been rocked to nearly its full distance in one direction.
Figure 10:
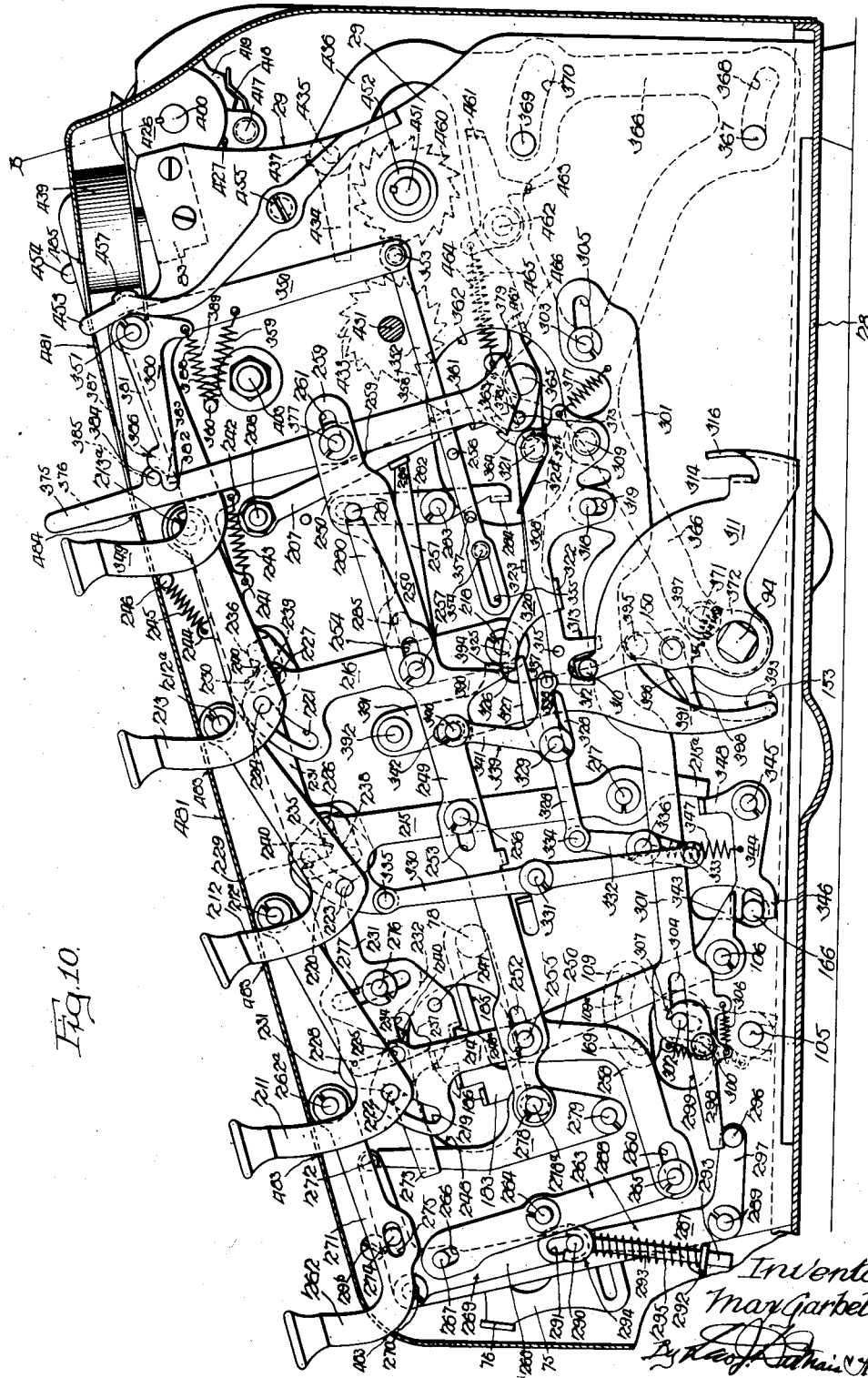
Figure 10 is a longitudinal sectional view similar to Fig. 6, illustrating the sub-total control key in depressed position with its associated parts in their changed position and with the actuator shaft in its normal at-rest position.
Figure 11:
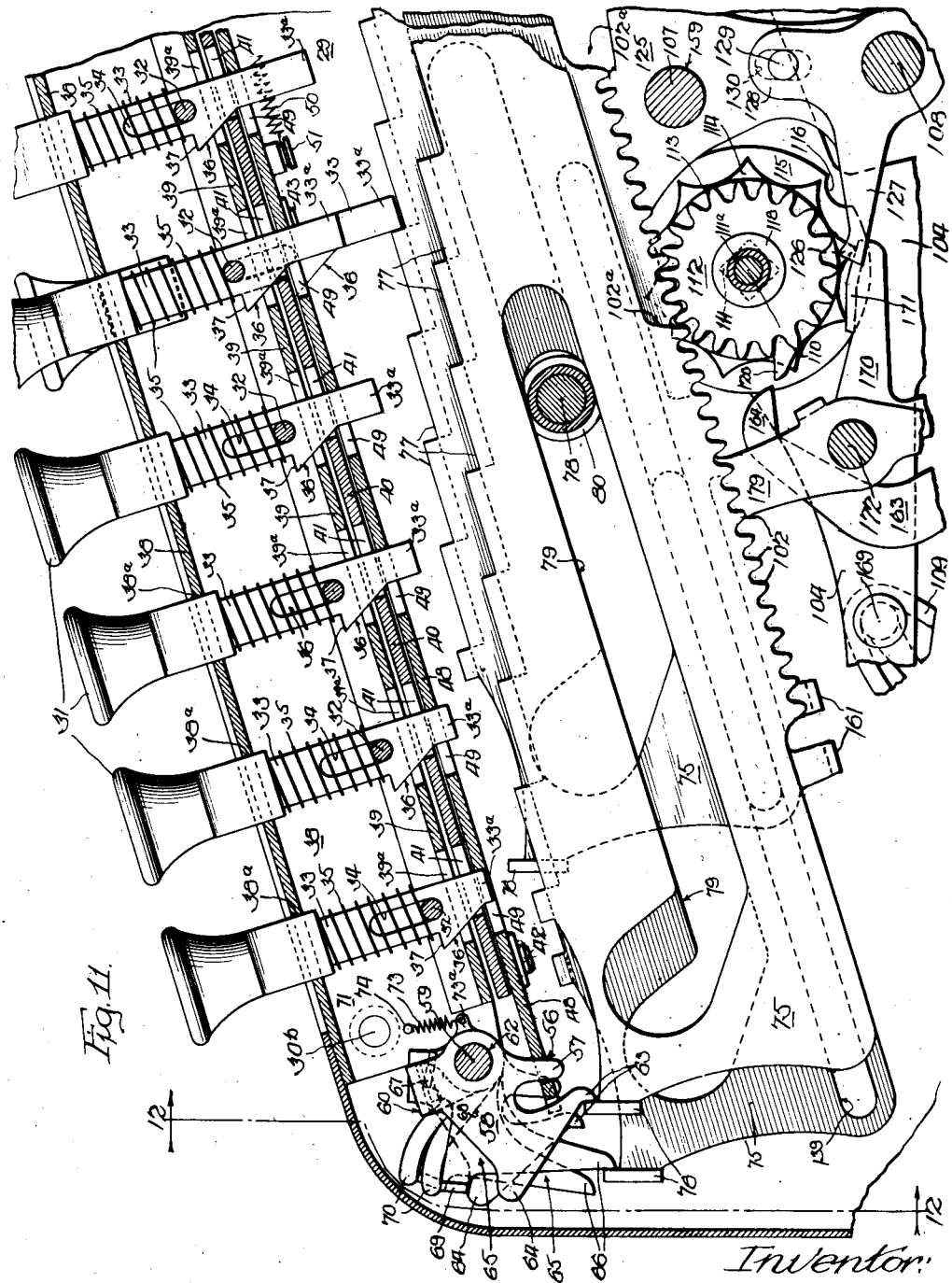
Figure 11 is an enlarged fragmentary longitudinal detail sectional view showing the front portion of the machine with one of the type bars engaged by a zero stop and with one of the digit keys in depressed position.

The depression of the sub-total key 212 (Fig. 10) or the total key 211 (Fig. 8) will rock the arms 215 or 214 and effect a rearward sliding movement of all three of the shift members 249, 250 and 251, as shown in Figs. 8, 9 and 10. The shift member 251 will rock the arm 207 and slide locks 54, and cause a forward sliding movement of the slides 40 to release the keys of the keyboard, and the studs 47 on the slides 40 will engage the slides 48 to carry the stops 58—65 out of the path of the ears 76 on the type bars, rendering them free of the keyboard.

The depression of the sub-total key 212 rocks the lever 215 (Fig. 10), which has a lever 330 operatively connected thereto by a pin and slot connection indicated as 335 and is pivoted on a stud 331 extending from the side plate 29. This lever 330 has its lower end portion connected by a pin and slot connection 333 to a relatively short rocker 332, which is carried by a stud 336 on the side plate 29, and has its other end pivotally connected at 334 to a member 328 that is provided with a bifurcated end portion that straddles a stud 329 fixed to the side plate 29. The member 328 is adapted, when moved, to slide on the stud 329 and position the top leg 327 thereof under an ear 326 of an extension 325 on a sub-total control arm 320 that is carried on a control arm 308 which is pivoted to a control member 301. The leg 327 serves to engage the ear 326 to retain the sub-total arm 320 in raised position, as will be later described.

The movement of the shift member 249 effects the movement of the arm 278 which is pivotally connected thereto by a pin 278a, and which arm is pivoted on a stud 279 fixed to the side plate 29 (Figs. 8, 9 and 10). When the shift member 249 is moved, the arm 278 is rocked into the path of a pin 272 fixed on the leg 271 of the bell-crank 269, to prevent its movement and the depression of the non-add key 262. During this movement of the shift member 249, an extension 390 thereon engages an ear 394 of a depending arm 391 carried on a stud 392 fixed to the side plate 29, and rocks this arm 391 rearwardly. The arm 391 serves to turn and adjust the position of the shaft 150 which extends across the lower ends of the depending arms 154 of the type bar lock arms 160 (Figs. 3, 4, 5, 13, 14, 15 and 17), and has one end supported in the sector 311 and its other end extends through an arcuate opening 153 in the side plate 30, and which is supported on the segmental gear 151. The shaft 150 is normally adapted to engage and rock the arms 154 as the actuator shaft 94 is rocked.

The depending arm 391 (Figs. 6 to 10, 13, 14 and 15), is provided with an arcuate edge 393 at its lower end portion, which is brought into engagement with a stud 395 carried on a bell-crank 336, that is fixed to the shaft 150 adjacent the sector 311, and which, when engaged by the arm 391, serves to turn the shaft 150 to direct a flattened portion 152 thereon, toward the arms 154. When the shaft 150 is in this position (Figs. 8 and 10), during the sub-total operation of the machine, the flattened portion 152 of the shaft 150 will clear the arcuate edges 155 of the depending arms 154, and the type bar lock arms 160 will remain locked with the type bars as the shaft 150 is bodily carried with the actuator shaft 94, and the totalizer units will effect the disengagement of the arms 160, as will be later described. These arms 154 (Figs. 13, 14 and 15), are operatively connected with each other by means of extensions 154a thereon that extend to the right and overlap the adjacent depending arm 154 of higher order so that the movement of one of the arms will effect the movement of the arms of lower order. The bell-crank 396 (Figs. 6 to 10, inclusive), fixed to the shaft 150 is normally urged with the leg 398 thereof resting against the actuator shaft 94 by means of a spring 397 fixed thereto and to the sector 311.

The shift member 249 controls the movements of a bell-crank 339 which has a leg 341 provided with a pin 340 fixed thereto that extends into a slot 342 in the shift member, and is pivotally carried on the stud 329 adjacent the member 328. The bell-crank 339 has a pin 337 fixed to its other leg 338, which pin normally overlies the free end of a control arm 308 that is pivotally carried by a pin 309 fixed to a control member 301. The free end portion of the control arm 308 is yieldably urged against the pin 337 of the bell-crank 339 by means of a spring 317 fixed thereto and to the control member 301, and is limited in its movements by means of a slot 319 therein engaging a pin 318 fixed to the control member.

The control member 301 is provided near each end thereof with slots 304 and 305, respectively, through which slots a stud 302 on a regulating device 109 and a stud 303 on the side plate 29 extend to guide the same. The control arm 308 is adapted to be engaged by the sector 311 when the machine is operated, as will be later described.

*Totalizers*

The totalizers or accumulators (Figs. 2, 3, 4, 5, 11, 13, 14, 15, 16 and 18), comprise a plurality of units A, which are pivotally mounted on a cross-shaft 110, carried in movable side arms 103 and 104, which are pivotally carried on the shaft 91 adjacent the side plates 29 and 30, and which comprise a frame to support the totalizers. The free ends of the arms 103 and 104 each have a stud 169 fixed thereto, each of which is operatively connected to a regulating device 109 carried adjacent the arms 103—104 in fixed relation with a shaft 105 that is journaled in the side plates 29 and 30.

The totalizer or accumulator units are each provided with a square bushing 111, which has a bore 111a therein, through which the shaft 110 extends. The square bushing serves as a key on which a gear 112, a total stop disc 113, a detent star wheel 114, and a type bar release disc 115, are mounted, and which are held in spaced relation by spacing washers 117, and are retained on the bushing 111 by means of flanges 118 at each end thereof. The total stop disc 113 is provided with a peripheral lug 120 and has a pair of studs 121 and 122, respectively, which are secured on opposite faces thereof (Fig. 18), in substantially diametrical relation to each other, and which function with the transfer mechanism, as will be later described. The type bar release discs 115 are each provided with a notch 116 on their peripheries, which coact with the pins 162 of the type bar lock arms 160, as the units are moved in meshing engagement with the teeth 102 of the type bars 75.

The totalizer units A are carried in spaced relation on the shaft 110 by means of collars 119 with each of the gears 112 thereof aligned for meshing engagement with the teeth 102 of the type bars.

Totalizer and addition

During the normal operation of the machine (Fig. 3), the shaft 150 will engage and move the arms 154 to release the type bar lock arms 160 and permit the type bars 75, which have been released by the digit keys 31 to be moved rearwardly as the operating lever 486 is pulled forward (Fig. 4). The released type bars will be moved until arrested by the depressed keys, and those to the right thereof will move until arrested by the zero stops 58 to position the zeros thereof in the printing line B. The actuator shaft 94 will carry the sector 311 therewith (Fig. 6) and will position an extension 316 thereon under a pin 315 of the control arm 308 to prevent its depression as shown in Fig. 7 and cause an ear 314 on the sector to engage to move the control arm 308 and control member 301 forwardly (Fig. 9), at near the limit of movement of the operating lever 486. This forward movement of the control member 301 causes a forward rocking movement of the regulating devices 109—109, which are fixed to a shaft 105 journaled in the side plates 29 and 30, and which are operatively connected to the control member 301 by means of the pin 302 fixed to one of the regulating devices and is held at the forward end of the elongated slot opening 304 of the control member 301 by means of a hook member 299. The regulating devices 109—109 are each provided with a cam slot 109a—109a into which the studs 169—169 of the arms 103 and 104 extend, and the forward movement of these regulating devices causes the arms 103 and 104 to be elevated, which carries the units A therewith to position the gears 112 thereof into meshing engagement with the rack teeth 102 of the type bars 75 (Fig. 4). The ear 314 on the sector 311 will engage the shoulder 313 of the control arm 308 during the time the dwell 99 of the Geneva locking member 97 (Fig. 19), is in sliding engagement with the surface 101 of the Geneva lock 96. Upon the rearward or restoring movement of the operating lever 486, the sector 311 is carried therewith, away from the shoulder 313 of the control arm 308, which permits the control member 301 to remain in its forward advanced position with the totalizer units in engagement with the type bars. When the totalizer units A are in their zero positions and are brought into mesh with the teeth 102 of the type bars, (Fig. 5), the notches 116 on the peripheries of the type bar release discs 115 will be aligned with the pins 162 of the type bar stop arms 160 and these arms will not be disengaged from the ears 161 of the type bars, but the shaft 150 will be carried by the actuator shaft 94 and engage to rock the arms 154 and arms 160 to disengage the type bars (Fig. 15).

The restoring movement of the operating lever 486 causes the restoring movement of the type bars until the end 102a of the teeth 102 thereof has passed the gears 112, which movement runs into the totalizers the amounts set up in the keyboard. As the sector 311 nears its limit return movement, a pin 310 thereon will engage the control arm 308 to restore the same and carry the control member 301 therewith to rock the regulating devices 109—109 rearwardly and swing the arms 103—104 downwardly with the units A out of engagement with the type bars.

Subtraction

When the machine is conditioned for subtraction, the subtraction key 213 is depressed. During the operation of the machine, the totalizer units are moved into mesh with the teeth of the type bars near the beginning of the forward stroke of the handle and out of mesh near the end of the forward stroke so that the totalizer units are turned clockwise to extents proportional to the values of the depressed digit keys, the machine being adapted to perform direct subtraction, but the machine is not intended to subtract larger numbers from smaller numbers. To ascertain the amount accumulated in the totalizer before subtraction operations, the sub-total key may be depressed, and then amounts up to the sum accumulated may be subtracted.

The depression of the subtraction key 213 rocks the lever 216 which effects a rearward sliding movement of the shift members 249 and 250, and the movement of the shift member 249 effects a downward rocking movement of the bell-crank 339 and causes the pin 337 on the leg 338 thereof to depress the control arm 308 with the bifurcated opening 312 at the free end thereof, over the pin 310 on the sector 311, in the manner shown in Fig. 8. As the handle 488 is rocked forwardly upon its starting movement, the sector 311 will be carried therewith and the pin 310 thereon will carry the control arm 308 and the control member 301 forwardly and effect a forward rocking movement of the regulating devices 109—109 and elevate the arms 103—104 and carry the totalizer units A into engagement with the type bars 75, and at which time, the pin 310 is carried out of engagement with the bifurcated opening 312 of the control arm 308. After the units A are engaged with the type bars, the latter are moved differentially from normal position to rotate the units A reversely, to subtract the amount set up in the keyboard. Near the forward end of the stroke of the handle and after the totalizer units A have been actuated, the ear 314 on the sector 311 will ride under the ear 322 of the sub-total control arm 320 and engage the shoulder 313 of the control arm 308, and at which time, the spring 324 will urge the sub-total control arm 320 downwardly and retain the ear 314 between the ears 322 and the shoulder 313. During this time, the extension 316 of the sector 311 is positioned over the pin 315 of the control arm 308 to retain the same in depressed position and to retain the sub-total control arm 320 readily engageable with the ear 314 of the sector 311. Upon the return movement of the handle, the sector 311 is carried therewith, and the ear 314 will engage the ear 322 of the sub-total control arm 320 and force the control member 301 rearwardly and carry the regulating devices 109—109 therewith to rock the arms 103—104 downwardly and disengage the totalizer units from the type bars.

Transfer mechanism

The detent star wheels 114 of each of the totalizer units A are constantly engaged by the V-portion 171 of a pawl 170 (Figs. 3, 4, 13, 14 and 15). These pawls are carried for movement with the arms 103 and 104 on a shaft 172 secured to the arms, and are each yieldingly urged by a spring 173 fixed to the pawls and to a cross member 95 which is also carried on the arms 103—104. When the totalizer units A are out of mesh with the teeth 102 of the type bars 75 (Figs. 3, 13 and 14), the pawls 170 yieldingly retain them from turning movements.

The racks 85 on the type bars 75 carry a slide member 133 that is also arranged for independent given movements, being provided with elongated slot openings 134 and 135 at each end thereof, which receive the studs 86 and 87, respectively, of the racks 85. The slide members 133 each carry a pawl 174 that is pivoted on a pin 174a fixed thereto and which has a tooth-engaging end 175 that normally depends below the teeth 102 of the type bar, and is urged in this position by a spring 176 fixed thereto and to the slide member, being limited in its movements by a pin 177 that extends into a slot opening 178 in the pawl. The slide member 133 is urged forwardly by means of a spring 136 fixed thereto and to a link 137, which is also slidably carried on the type bar 75 with the rack 85, as will be later described. Each of the slide members 133 have an extension 132 thereon, which limits its forward movement by engagement with an inturned end 131 of a rockable member 125 controlled by a totalizer unit in the adjacent bank of lower order. The rockable members 125 are carried for rocking movements on the shaft 107 (Figs. 13, 14 and 15), and are each provided with a bifurcated lower portion which straddles a shaft 108, and provides a leg 142 thereon which has its lowermost end 142a provided with a notch 143 adapted to be engaged by a notch 146 of an engaging arm 144 which is pivotally carried on a shaft 145 and is connected to the other leg 148 of the rockable member 125 by means of a spring 147. The arm 144 has a depending portion 149 which is normally engaged by the shaft 150 that positions the arm 144, as shown in Fig. 14. The rockable members 125 are each provided with an arcuate integral arm 124, which extends over a totalizer unit A and has a downwardly directed cam 123 thereon, which is adapted to be engaged by the pin 122 on the total stop disc 113 when the totalizer units are engaged with and rotated by the type bars. When the pin 122 engages the cam 123, it will effect a rocking movement of the rockable member 125 and carry the inturned portion 131 thereof out of the path of the depending portion 132 of the adjacent slide member 133 of higher order. An arm 127 is pivotally carried on the shaft 108 adjacent each rockable member 125 and is provided with an extension 128 which carries a stud 129 that extends into a vertical slot opening 130 in the member 125 to form a toggle therewith. The arms 127 are each provided with an upwardly directed cam portion 126 that is adapted to be engaged by a pin 121 of the coacting total stop disc 113 during the rotating movements of the totalizer units A only when the totalizer units are out of meshing engagement with the teeth 102 of the type bars, as will be presently described.

With the machine conditioned for performing addition, the operation of the transfer mechanism is as follows:

When the totalizer units are carried into mesh with the teeth 102 of the type bars 75 at the beginning of the return stroke of the machine, the type bars remain in the positions to which they have been advanced, until the racks 85 are slidably returned on the type bars and the studs 86 of the racks engage the ends 84a of the slots 84 to return the type bars therewith and run into the totalizers, the amounts set up in the keyboard. The return movement of the racks 85 carries the slide members 133 therewith until they are arrested by the ends 131 of the rockable members 125, and at which time, the racks will move in advance of the arrested slide members 133, and the studs 86 and 87 of the racks will ride freely in the slot openings 134 and 135 of the slide members 133. These slide members also control the movements of links 137 which have an elongated slot 138 therein through which the studs 86 extend, and are each guided in a slot 139 in the type bars by means of a pin 140. The links 137 are yieldingly connected with the slides 133 by a spring 136. This return movement of the racks 85 in advance of the slide members 133 causes the studs 86 of each of the racks to engage the elongated slot opening 138 in the links 137 and carry the same therewith to exert a pull on the springs 136 and yieldingly urge the slide members 133 against the ends 131 of the rockable members 125. While the units are being rotated counter-clockwise by the restoring movement of the type bars and a pin 122 on a total stop disc 113 of a totalizer unit is carried to engage the cam 123 on the arm 124 of the coacting member 125, this pin 122 will rock the member 125 and carry the end 131 thereof away from the extension 132 of the slide 133 in the adjacent bank of higher order and permit this slide member to be spring-urged forwardly and carry the pawl 174 therewith until the end 175 thereof engages to turn the gear 112 of the totalizer unit of higher order.

As the inturned portion 131 of each of the rockable members 125 extends to the left (Figs. 2, 16, 17 and 18), it will be seen that the totalizer unit of lower order controls the carry-over mechanism, consisting of the slide 133 and pawl 174 of the adjacent unit of higher order, during adding operations.

During subtraction operations, the subtraction key 213 is depressed, and when the machine is operated, the totalizer units are elevated into the path of movement of the teeth 102 of the type bars, and as these type bars are carried rearwardly by means of their racks 85 and springs 88, the totalizer units will be rotated clockwise the distance the type bars are permitted to move until arrested by the depressed digit keys 31. During this rearward movement of the type bars (Figs. 4 and 15), the racks 85 will carry the links 137 therewith by means of the springs 136 connecting the two, until the extension 141 on the link 137 engages the end 124a of the arms 124 on the rockable members 125, which limits the rearward movement of the links 137 but permits the racks 85 to move in advance thereof. The links 137 each have a pin 140 fixed at their free ends, which guide them in the slots 139 of the type bars, and which pins 140 are each brought into engagement with an upwardly extending arm 179 which is carried for rocking movements on the shaft 172. These arms 179 have a pawl 180 pivoted thereon at 179a and are each yieldingly retained against an ear 181 on the arms 179 by means of a spring 182. Upon a further movement, all of the racks 85 will be slidably carried in advance of the type bars against the tension of their springs 88 and in advance of the links 137 against the tension of the springs 136, and during this time, the studs 86 of the racks 133 will slide in the elongated slot openings 138 of all of the links 137. When the pin 122 of a totalizer unit engages the cam 123 of the arm 124 on the rockable member 125 while the totalizer units are engaged with the type bars or when the pin 121 of the totalizer engages the cam 126 of the arm 127 during the time the totalizer units are being disengaged from the type bars, the rocker member 125 will be rocked to carry the end 124a thereof out of the path of the ear 141 on the link 137, and permit this link 137 to be instantly urged rearwardly by its spring 136 and cause the pin 140 thereon to rock the coacting arm 179 with the pawl 180 into engagement with the teeth of a coacting totalizer unit to rotate the same one-tenth of a turn. The rotating movement of the totalizer unit will cause the pin 122 to engage the cam 123 and rock the member 125 in the same manner as above described, or the pin 121 will engage the cam 126 of the arm 127 to rock the member 125 as the totalizer units are being restored out of mesh with the type bars.

When the rockable member 125 is rocked for a carry-over, the arm 144 is urged upwardly by the spring 147 and the notch 146 thereof engages the lower portion 142a of the leg 142 of the rockable member 125 and retains the same (Fig. 15). Upon the return movement of the actuator shaft 94, the shaft 150 will engage the extension 149 of the arm 144 and rock the same downwardly. At this time, the spring 147 will restore the rockable member with the notch 143 thereof again engaged by the notch 146 of the arm 144 (Fig. 14).

During adding operations, the totalizer is brought into engagement with the type bars 75 at the beginning of their restoring movements and remains in engagement therewith until the type bars have been restored. During subtraction operations, the totalizer is brought into engagement with the type bars 75 at the beginning of their movement and remains in engagement therewith during this movement and is disengaged therefrom during the restoring movement of the type bars.

It will be noted that during subtraction operations when a carry-over occurs, the pawl 180 will be brought into engagement with its coacting totalizer gear 112 when the member 125 is tripped and this pawl 180 will effect a movement of the gear for a carry. This carry occurs upon the rearward movement of the type bars during subtraction, and as the type bars are about to be restored, the totalizer is carried out of engagement therewith permitting the type bars to be restored independently thereof. During this restoring movement of the type bars, the pawl 174 is carried with the driving racks 85 past the member 125 which has been tilted, and permits the nose 175 of the pawl 174 to pass beyond the totalizer gear without engaging the same. This pawl 174 will not effect movement of the totalizer gear, in that, the totalizer at this time is in its lowered position and permits the pawl 174 to freely pass the same.

Non-add

When the non-add key 262 is depressed (Fig. 7), the bell-crank 269 will be rocked thereby, which rocks a bell-crank 287 pivoted to the side plate 29 on a stud 289 which has a leg 288 operatively connected to the bell-crank 269 by means of a pin 290. The rocking movement of the bell-crank 287 causes a pin 296 on its other leg 297 to engage an extension 298 of the hook member 299 carried on the control member 301 and to rock the same on its pivot 300. The rocking movement of the hook member 299 carries the end 307 thereof out of engagement with the pin 302 of the regulating device 109, and permits the control member 301 to be free thereof during its sliding movements. The hook member 299 is normally urged into engagement with the pin 302 of the regulating device by means of a spring 306. The rocking movement of the bell-crank 269 also rocks the arm 263 which effects a rearward sliding movement of the shift member 250 and rocks the arm 282 on its pivot 283 to position the lower end 284 of the arm into the path of movement of the pawl 364 which is normally adapted to restore the arm 282 and shift member 250.

As the machine is operated (Fig. 7), the sector 311 is carried with the actuator shaft 94, and the extension 316 of the sector is carried under the pin 315 of the control arm 308 to lock the same, while the ear 314 on the sector engages the shoulder 313 of the control arm 308 and carries the control arm and control member 301 forwardly. The control member 301 moves forwardly free of the regulating devices 109—109 which permits the totalizer units A to remain out of mesh with the teeth of the type bars. The control arm 308 and control member 301 are restored upon the return movement of the actuator shaft 94 by engagement of the stud 310 on the sector 311, with the shoulder 313 of the control arm. The return movement of the actuator shaft carries the skeleton frame 366 therewith, and the pawl 364 thereon will engage the end 284 of the arm 282, to rock the same and urge the shift member 250 rearwardly which effects a rocking movement of the member 263 to restore the bell-crank 269 with the non-add key 262 and bell-crank 287 to normal position. The restoring movement of the bell-crank 287 carries the pin 296 thereon downwardly and permits the hook member 299 to be urged by its spring 306 with the end 307 thereof locked with the pin 302 to again secure the regulating devices 109—109 for movement with the control arm 301 (Fig. 8).

The bell-cranks 269 and 287 are connected to form a break-joint, the leg 288 of the bell-crank 287 being provided with a slot 291 through which the pin 290 on the leg 268 of the bell-crank 269 extends. The pin 291 is engaged by a U-shaped head 294 of a plunger 293 which is guided in an ear 292 on the leg 288 of the bell-crank 287 and which is urged against the pin 290 by a spring 295.

Total and sub-total printing

When a total registered on the totalizer units is to be taken and printed by the type bars, the totalizer units are carried into engagement with the teeth of the type bars, so that they are turned reversely to "0" position during the forward stroke of the operating handle, and the type bars being correspondingly positioned to print the total. During the return stroke of the operating handle, the totalizer units are carried out of engagement with the type bars, so that they remain in "0" position. When a sub-total is to be printed the operation is the same as during a printing operation, except that the totalizer units remain in engagement with the teeth of the type bars during their return movement to normal position, to restore the total in the totalizer units.

When the total key is depressed, as shown in Fig. 8, the vertical lever 214 is rocked clockwise on the shaft 106, and the end 343 of the lever will bodily depress a shaft 166 secured to a pair of links 167—167 which are carried for swinging movements on the shaft 106 adjacent the side plates 29 and 30. The shaft 166 is retained in engagement with the end 343 of the lever 214 by means of an arm 344 which is pivoted on a stud 345 carried on the side plate 29, and which has a bifurcated end 346 engaging the shaft 166 and which arm is urged upwardly by a spring 347 fixed thereto and to a stud 336. The arm 344 is limited in its upward movement by an ear 348 thereon that engages the depending end 215a of the sub-total lever 215. The shaft 166, (Figs. 3, 4, 5, 14 and 15), controls the movements of total stop arms 163 that are pivoted on the shaft 106, and which are urged with their ends 165 against the shaft 166 by means of a torsion spring 168 fixed thereto at 163a, and with its other end engaging the shaft 166. The upper portion of the total stop arms 163 are each provided with hook-like ends 164 that are normally retained in spaced relation with the totalizer units and readily engageable with the lugs 120 on the total stop discs 113. As the shaft 166 is depressed, as above described, the total stop arms 163 are urged with their hook-like ends 164 into the path of movement of the lugs 120 on the total stop discs 113 by means of the springs 168. During this time, the lever 214 has shifted the shift members 249, 250 and 251 (Fig. 8), and the shift member 249 has rocked the bell-crank 339 with the pin 337 thereon depressing the control arm 308 to engage the bifurcated end 312 thereof with the pin 310 of the sector 311. Upon the operation of the machine, the sector 311 will shift the control arm 308 and control member 301 and cause the totalizer units to mesh with the teeth of the type bars, and, as the type bars are carried rearwardly, the totalizer units will be rotated clockwise until the lug 120 thereof engages the hook-like ends 164 of the total stop arms 163, which will each withhold a unit from turning movement to limit the movement of a type bar coacting therewith and position the type thereof in the printing line B in accordance with the amount contained in the totalizer units.

When the sub-total key 212 is depressed (Fig. 10), it rocks the lever 215 and the depending end 215a thereof rocks the arm 344 on its stud 345 and carries the shaft 166 downwardly, which permits the total stop arms 163 to be urged by their springs 168 with the hook-like ends 164 into the path of the lugs 120 on the total stop discs 113, in the same manner as above described.

At this time, the three shift members 249, 250 and 251 (Fig. 10), are moved rearwardly and the extension 390 of the shift member 249 engages the ear 394 of the depending arm 391 and swings the same on the stud 392 with the lower edge 393 thereof engaging the stud 395 of the bell-crank 396 to rock the same and shaft 150, and position the flattened portion 152 of the shaft aligned with the arcuate edge of the arms 154. The movement of the lever 215 rocks the levers 330 and 332, which effect a rearward sliding movement of the bifurcated member 328 on the stud 329, and positions the leg 327 of this member 328 under the ear 326 of the sub-total control arm 320 (Fig. 10). The sub-total control arm 320 is pivotally carried on the control arm 308 at 321 and is provided with ears 322 and 323 that extend above and below the arm 308, with the ear 323 normally urged by a spring 324 to engage the top of the arm 308. The movement of the shift member 249 will rock the bell-crank 339 and cause the pin 337 thereon to depress the control arm 308 with the bifurcated end 312 thereof engaged with the stud 310 of the sector 311. As the machine is operated, the stud 310 will carry the control arm 308 forwardly for sliding movement under the pin 337 and the control arm will carry the control member 301 therewith, to rock the regulating devices 109—109, and position the totalizer units in mesh with the teeth of the type bars. During this forward movement of the control arm 308, the sub-total control arm 320 will slide over the leg 327 of the bifurcated member 328 and retain the ear 322 thereof, out of the path of the ear 314 on the sector 311. The pin 310 of the sector 311 disengages itself from the bifurcated portion 312 of the control arm, as the control member 301 reaches the end of its slot opening 305. This movement of the control member 301 occurs at the starting stroke of the machine, while the dwell 98 of the Geneva locking member 97 is in sliding engagement with the Geneva lock 96.

As the totalizer units are moved into engagement with the type bars, the type bar release disc 115 of the totalizer units will engage the pins 162 of the type bar lock arms 160 in all digital orders carrying values other than zero, and due to the overlapping extensions 154a on the arm 154 of the type bar lock arm 160, all of the type bars to the right of a released type bar, will be released. In the orders where the totalizer units remain at zero, the pins 162 of the arms 160 will be received in the notches 116 of the discs 115 and these arms 160 will not be released from the type bars. Upon the return stroke of the operating handle 488, the totalizer units remain in engagement with the type bars, which restores the total therein. This is accomplished by the free restoring movement of the sector until the stud 310 thereon again engages the control arm 308 to restore the control member 301 and the totalizer units.

When an error has occurred in depressing a control key, the error key 349 may be depressed, which effects a pull on the link 352 and carries a pin 357 thereon to engage and rock the arm 282 which restores the shift member 250, and the pin 281 in the member 250 will engage the end 280 of the shift member 249 and restore the same therewith. The shift member 251 is then free to be restored by engagement of the depending arm 207 therewith and which arm is operatively connected to the slides 40 of the keyboard and urged to normal position by the springs 46 of the slides 40.

*Control key repeat*

Figure 1:
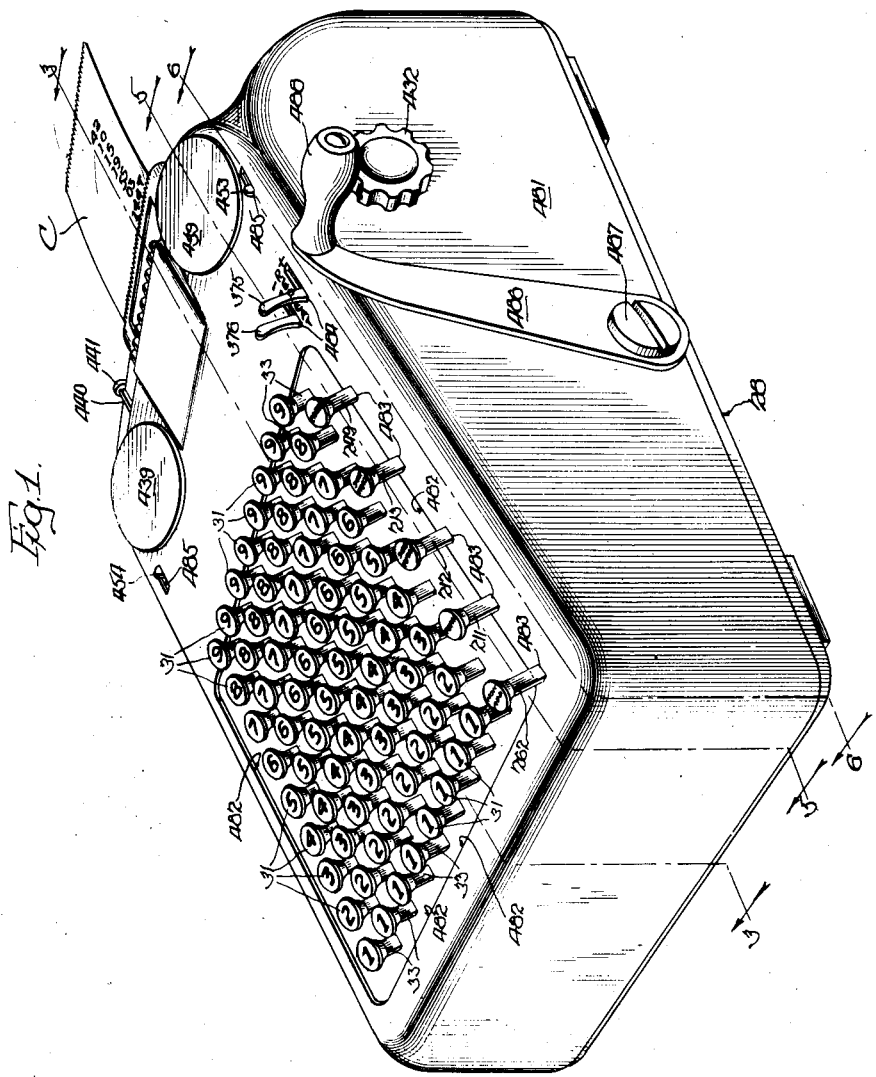
Figure 1 illustrates a perspective view of an adding machine embodying my improvements.

When the total, sub-total or subtraction key is depressed and a number of repeat operations are to be made, a repeat lever 376, marked "+" (Fig. 1), is employed. This repeat lever is pivoted on the stud 377 with the digit key repeat lever, but is positioned adjacent the inner side of the side plate 29 (Fig. 2), and this repeat lever is also provided with a cam 378 and a dwell 379 at its lower end and has a pin 385 fixed at its top end. The pin 385 is engaged by a retaining member 381 which is provided with a lug 387 on the top edge of its free end 383 over which the pin 385 is adapted to ride as the repeat lever 376 is moved. The retaining member 381 is urged against the pin 385 of the repeat lever 376 by a spring 389 fixed thereto, and to the pin 360 fixed in the side plate 29. This repeat lever 376 is normally retained with the cam 378 thereof out of engagement with a pin 374 on the pawl 364 carried on the skeleton frame 366, and when the repeat lever is moved rearwardly, this cam surface 378 will ride over the pin 374 of the pawl 364 until the dwell 379 engages the pin to retain the pawl depressed. When the pawl 364 is in this depressed position and is carried by the skeleton frame 366 during the operations of the machine, it will not engage the ear 284 of the rocker arm 282, and the shift members 249, 250 and 251 will remain in the positions to which they have been moved by the depression of a control key.

When the two repeat levers 375 and 376 are moved rearwardly, the two pawls 363 and 364 will be depressed free of engagement of the arms 207 and 282, which will permit of a number of repeat operations without effecting the release of the depressed digit keys in the keyboard or of a depressed control key.

Casing

A shell-like casing 481 encloses all of the working parts and is provided with a relatively large opening 482 in its top portion, through which the keys of the keyboard extend. The casing is also provided with a plurality of openings 483 to the right of the keyboard through which the bank of control keys extend. Rearwardly of the control keys, the casing has a pair of aligned slot openings 484 through which the repeat levers 375 and 376 extend, and the rearward top portion of the casing is arranged to receive the ribbon spools 438—439, and has slot openings 485 adjacent thereto through which the top ends of the ribbon followers 453 and 454 extend. The back wall of the casing 481 has a relatively large opening 489 therein, which is provided with a door 490, carried on a hinge 491, which has a spring 492 coacting therewith to retain the door closed. The top edge of the door 490 is provided with a pressed-in portion 493 to permit the gripping and opening of the door against the tension of the spring 492 for inserting or removing the record roll C in the container 480.

The machine is illustrated as operable with a lever 486 which is secured to the actuator shaft 94 by a screw 487, and which has an operating handle 488, but the same may be motor-operated without departing from the spirit and scope of the invention.

This application discloses numerous features not claimed herein, the same having been made the subject matter of divisional applications as follows:

Keyboard construction and key controls, filed November 7, 1934, Ser. No. 751,812, Pat. No. 2,091,778; Printing mechanism for adding and recording machines, filed November 13, 1934, Ser. No. 752,873, Pat. No. 2,082,282; Tens transfer mechanism, filed November 17, 1934, Ser. No. 753,449, Pat. No. 2,212,639.

I claim:

1. In an adding machine having accumulator wheels and actuators therefor, a driving mechanism, lock arms engaging and retaining said actuators in initial position, each of said lock arms being under the control of an accumulator wheel for locking or releasing the coacting actuators, said lock arms extending to the driving mechanism, means on the driving mechanism normally effecting the release of the lock arms from the actuators upon each operation of the driving mechanism, a total and a sub-total key, operative connections between the total and sub-total keys and the means, on the driving mechanism for rendering said means ineffective to release said lock arms whereby said lock arms are then left under control of the accumulator wheels.

2. In an adding machine having accumulator wheels and actuators therefor, lock arms normally retaining each actuator in initial position, said lock arms being under the control of the accumulator wheels for locking or releasing the coacting actuators, a driving mechanism, said lock arms extending to the driving mechanism, means on the driving mechanism normally effecting the release of the lock arms from the actuators, key operated means rendering the said means on the driving mechanism inactive with the lock arms whereby said lock arms are then left under the control of the accumulator wheels.

3. In an adding machine, the combination of accumulator wheels and actuators therefor, a driving mechanism for the actuators, lock arms engaging and retaining the actuators in initial position, said lock arms being under the control of the accumulator wheels for locking and releasing the coacting actuators, said lock arms also extending to the driving mechanism, means on the driving mechanism for engaging and releasing said lock arms from the actuators upon movement of the driving mechanism, and manually manipulative means for rendering the said means of the driving mechanism ineffective whereby said lock arms are then left under control of the accumulator wheels.

MAX GARBELL.